(12) United States Patent
Zhang et al.

(10) Patent No.: US 11,589,324 B2
(45) Date of Patent: Feb. 21, 2023

(54) CONFIGURATION METHOD AND DEVICE FOR TIMING ADVANCE INFORMATION

(71) Applicant: ZTE CORPORATION, Shenzhen (CN)

(72) Inventors: Nan Zhang, Shenzhen (CN); Chuangxin Jiang, Shenzhen (CN); Zhaohua Lu, Shenzhen (CN); Yijian Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 56 days.

(21) Appl. No.: 17/256,799

(22) PCT Filed: Jun. 11, 2019

(86) PCT No.: PCT/CN2019/090648
§ 371 (c)(1),
(2) Date: Dec. 29, 2020

(87) PCT Pub. No.: WO2020/001264
PCT Pub. Date: Jan. 2, 2020

(65) Prior Publication Data
US 2021/0289461 A1    Sep. 16, 2021

(30) Foreign Application Priority Data
Jun. 29, 2018  (CN) .......................... 201810698041.0

(51) Int. Cl.
*H04W 56/00* (2009.01)
*H04L 5/00* (2006.01)

(52) U.S. Cl.
CPC ....... *H04W 56/0005* (2013.01); *H04L 5/0048* (2013.01); *H04W 56/001* (2013.01); *H04W 56/0045* (2013.01)

(58) Field of Classification Search
None
See application file for complete search history.

(56) References Cited

U.S. PATENT DOCUMENTS

2014/0307717 A1   10/2014 Barany
2016/0345316 A1*  11/2016 Kazmi ............. H04W 72/0413
2018/0110082 A1*   4/2018 Saily ..................... H04W 76/15

FOREIGN PATENT DOCUMENTS

| CN | 102123516 A |  | 7/2011 |  |
|---|---|---|---|---|
| CN | 102158948 A |  | 8/2011 |  |
| CN | 102860120 A |  | 1/2013 |  |
| EP | 3255954 A1 | * | 12/2017 | .......... H04L 1/0057 |

(Continued)

OTHER PUBLICATIONS

Chinese First Office Action, dated Sep. 28, 2021, pp. 1-6.

(Continued)

*Primary Examiner* — Alpus Hsu
*Assistant Examiner* — Camquyen Thai
(74) *Attorney, Agent, or Firm* — George McGuire

(57) ABSTRACT

Provided is a configuration method and device for timing advance information. The method comprises: a first transmission node indicates, through a number I of signaling, timing advance information corresponding to a number N of transmission links from a second transmission node to a number M of first transmission nodes, where I, M and N are all integers greater than or equal to 1.

23 Claims, 6 Drawing Sheets

A first transmission node indicates, through I signaling, timing advance information corresponding to N transmission links from a second transmission node to M first transmission nodes, where I, M and N are all integers greater than or equal to 1 — S102

(56) References Cited

FOREIGN PATENT DOCUMENTS

| EP | 3297343 A2 | 3/2018 |
|---|---|---|
| EP | 3297343 A3 | 6/2018 |
| KR | 20150084909 | 7/2015 |

OTHER PUBLICATIONS

UL eMBB transmission multiplexing with UL URLLC, Lenovo, Motorola Mobility, 3GPP TSG RAN WG1 Meeting #88 R1-1702666, Feb. 17, 2017.
On eMBB/URLLC multiplexing for uplink transmission, Lenovo, Motorola Mobility, 3GPP TSN RAN WG1 NR Ad-Hoc#2, R1-1710606, Jun. 30, 2017.
Indication of URLLC Configuration, Ericsson, 3GPP TG-RAN WG1 Meeting #92b, R1-1803936, Apr. 16-20, 2018.
Chinese Search Report, pp. 1-2.
International Search Report Form PCT/ISA/210, and Written Opinion Form PCT/ISA/237, International Application No. PCT/CN2019/090648, pp. 1-5 International Filing dated Jun. 11, 2019, mailing date of search report dated Sep. 17, 2019.
CN Office Action, Application No. 201810698041.0, dated Mar. 28, 2022, pp. 1-7.
CN Supplemental Search Report, Application No. 2018106980410, pp. 1-2.
KR Office Action, dated Feb. 12, 2022, pp. 1-6.
Supplementary EP Search Report, Application No. 19827483.9, pp. 1-8.

\* cited by examiner

```
┌─────────────────────────────────────────────────────┐
│ A first transmission node indicates, through I     │
│ signaling, timing advance information               │
│ corresponding to N transmission links from a       │──S102
│ second transmission node to M first transmission    │
│ nodes, where I, M and N are all integers greater   │
│ than or equal to 1                                  │
└─────────────────────────────────────────────────────┘
```

FIG. 1

```
┌─────────────────────────────────────────────────────┐
│ A second transmission node receives I signaling    │──S202
│ transmitted by a first transmission node            │
└─────────────────────────────────────────────────────┘
                          │
                          ▼
┌─────────────────────────────────────────────────────┐
│ The second transmission node acquires, through     │
│ the signaling, timing advance information          │
│ corresponding to N transmission links from the     │──S204
│ second transmission node to M first transmission    │
│ nodes, where I, M and N are all integers greater   │
│ than or equal to 1                                  │
└─────────────────────────────────────────────────────┘
```

FIG. 2

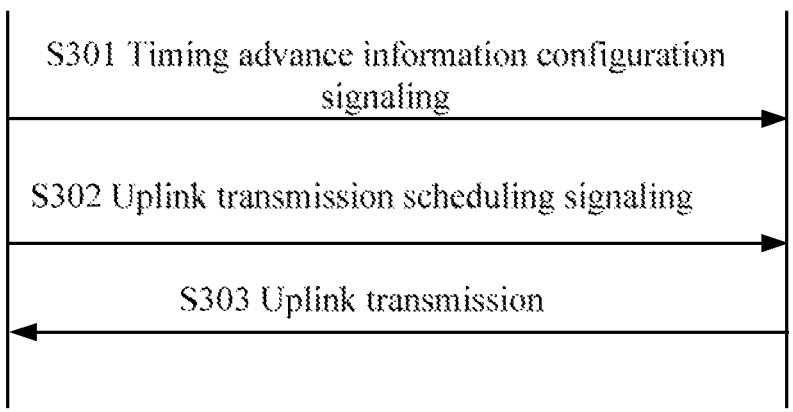

FIG. 3

CONFIGURATION METHOD AND DEVICE FOR TIMING ADVANCE INFORMATION

CROSS-REFERENCE TO RELATED APPLICATIONS

The present application is a National Stage Application, filed under 35 U.S.C. 371, of International Patent Application No. PCT/CN2019/090648, filed on Jun. 11, 2019, which claims priority to Chinese patent application No. 201810698041.0 filed with the Chinese Patent Office on Jun. 29, 2018, contents of both of which are incorporated herein by reference in their entireties.

TECHNICAL FIELD

The present application relates to the field of communications, and in particular, to a configuration method and device for timing advance information.

BACKGROUND

With the opening of a fifth generation of mobile communications, the adoption of multi-beam transmission between a terminal and a single station or the adoption of multi-beam transmission between the terminal and multiple stations has become the core of increasing user and system capacity in a next generation of wireless communication systems. At the same time, the coexistence and concurrency of a traditional enhanced mobile bandwidth (referred to as eMBB) service and other internet of things (referred to as IoT) related services (such as ultra-high reliability and ultra-low latency communication (referred to as URLLC)) have also become the highlight of 5G communication.

However, the above-described features also pose new challenges to the timing advance of transmission links between existing communication nodes. Specifically, for uplink multi-link/multi-beam transmission (specifically, one or more uplink transmissions are transmitted between the terminal and the single station by adopting multiple beams, or different uplink transmissions are transmitted between the terminal and the multiple stations by adopting multiple beams), the absolute time delay difference between transmissions has a relatively large range due to different paths experienced by link transmissions, a traditional method of configuring a single timing advance (referred to as TA) information for uplink transmission can no longer deal with multiple transmissions. In addition, since other IoT-related services (e.g., URLLC) and eMBB scheduling will likely coexist in future communications, but the transmission configuration adopted by different services, such as Cyclic Prefix (CP) length and subcarrier spacing, may be different, and the performance impact of sharing the same TA information among different services on low latency and high reliability services also needs to be further addressed. These become important issues in communication systems that need to be addressed.

No effective scheme has been proposed to address low transmission performance caused by using single timing advance (TA) information in multi-beam/multi-station transmission.

SUMMARY

Embodiments of the present disclosure provide a configuration method and device for timing advance information.

According to an embodiment of the present disclosure, a configuration method for time advance information is provided. The method includes: a first transmission node indicates, through a number I of signaling, timing advance information corresponding to a number N of transmission links from a second transmission node to a number M of first transmission nodes, where I, M and N are all integers greater than or equal to 1.

According to another embodiment of the present disclosure, a configuration method for time advance information is provided. The method includes: a second transmission node receives a number I of signaling transmitted by a first transmission node; and the second transmission node acquires, through the signaling, timing advance information corresponding to a number N of transmission links from the second transmission node to a number M of first transmission nodes, where I, M and N are integers greater than or equal to 1.

According to another embodiment of the present disclosure, a configuration device for time advance information is provided. The device is applied to a first transmission node. The device includes an indication module. The indication module is configured to indicate, through a number I of signaling, timing advance information corresponding to a number N of transmission links from a second transmission node to a number M of first transmission nodes, where I, M and N are all integers greater than or equal to 1.

According to another embodiment of the present disclosure, a configuration device for time advance information is provided. The device is applied to a second transmission node. The device includes a receiving module and an acquisition module. The receiving module is configured to receive a number I of signaling transmitted by a first transmission node. The acquisition module is configured to acquire, through the signaling, timing advance information corresponding to a number N of transmission links from the second transmission node to a number M of first transmission nodes, where I, M and N are integers greater than or equal to 1.

According to still another embodiment of the present disclosure, a storage medium is further provided. The storage medium stores computer programs, and the computer programs are executed to perform the steps in any one of the method embodiments described above.

According to still another embodiment of the present disclosure, an electronic device is further provided. The electronic device includes a memory and a processor. The memory stores computer programs, and the processor is configured to execute the computer programs to perform the steps in any one of the method embodiments described above.

According to the method and the device, the first transmission node indicates, through the I signaling, the timing advance information corresponding to the N transmission links from the second transmission node to the M first transmission nodes, where I, M and N are all integers greater than or equal to 1. Namely, the first transmission node configures, through the signaling, timing advance information required by the second transmission node for data transmission; and the second transmission node finishes configuring timing advance information from the second transmission node to the first transmission node according to the timing advance information indicated by the signaling.

BRIEF DESCRIPTION OF DRAWINGS

Among the drawings:

FIG. 1 is a flowchart of a configuration method for time advance information according to an embodiment of the present disclosure;

FIG. 2 is another flowchart of a configuration method for time advance information according to an embodiment of the present disclosure;

FIG. 3 is a flowchart (one) of a configuration of timing advance information between communication nodes according to an embodiment of the present disclosure;

DETAILED DESCRIPTION

Figure 4:
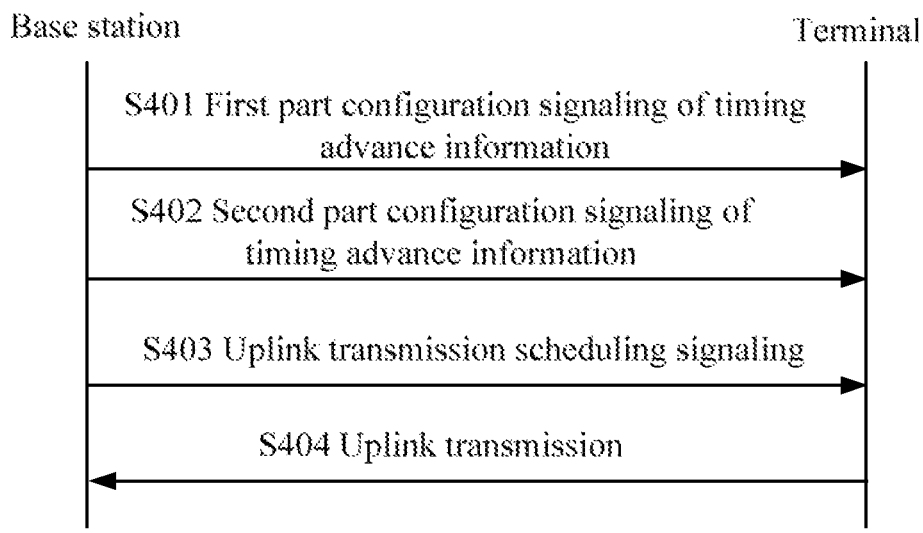
FIG. 4 is a flowchart (two) of a configuration of timing advance information between communication nodes according to an embodiment of the present disclosure.

The present application will be described in detail below with reference to the accompanying drawings and in conjunction with embodiments.

It should be noted that the terms "first," "second," and the like in the Description, the claims and the above-described drawings of the present application are used for distinguishing between similar objects and not necessarily for describing a particular order or sequence.

Embodiment 1

In this embodiment, a configuration method for time advance information is provided. FIG. 1 is a flowchart of a configuration method for time advance information according to an embodiment of the present disclosure. As shown in FIG. 1, the process includes following steps.

In step S102, a first transmission node indicates, through a number I of signaling, timing advance information corresponding to a number N of transmission links from a second transmission node to a number M of first transmission nodes, where I, M and N are all integers greater than or equal to 1.

In an embodiment, the timing advance information includes at least one of: a timing advance index, a timing advance value, a timing advance value step size, a timing advance value step size index, a timing advance value reference value, or a timing advance value reference index; each of the N transmission links includes at least one of: a data transmission channel, a control transmission channel, a random access channel, a modulation-demodulation signal, a phase noise compensation signal, a sounding reference signal, or a combination of a time division/frequency division/space division of the foregoing.

In an embodiment, the first transmission node may be a base station, and the second transmission node may be a terminal, but is not limited to this.

Through the above step S102, the first transmission node indicates, through the I signaling, the timing advance information corresponding to the N transmission links from the second transmission node to the M first transmission nodes, where I, M and N are all integers greater than or equal to 1. That is, the first transmission node configures, through the signaling, timing advance information required by the second transmission node for data transmission; and the second transmission node finishes configuring timing advance information from the second transmission node to the first transmission node according to the timing advance information indicated by the signaling, so as to address low transmission performance caused by the use of single TA in multi-beam/multi-station transmission in the related art, and the technical effect of improving the transmission performance is achieved.

In an embodiment, the step in which the first transmission node indicates, through the I signaling, the timing advance information corresponding to the N transmission links from the second transmission node to the M first transmission nodes includes following steps.

In step S11, the first transmission node configures, through first signaling, timing advance information for a number X of transmission configuration information corresponding to a n-th transmission link, where n and X are integers greater than or equal to 1;

The step in which the first transmission node configures, through the first signaling, the timing advance information for the X transmission configuration information corresponding to the n-th transmission link includes at least one of following manners.

Manner one: x-th transmission configuration information and timing advance information corresponding to the x-th transmission configuration information are jointly indicated by the first signaling, where x is an integer greater than or equal to 1; and/or if the timing advance information corresponding to the X transmission configuration information is the same, then the first transmission node configures timing advance information only for transmission configuration information with a minimum index or a maximum index among the X transmission configuration information.

Manner two: a number Y of timing advance information corresponding to the X transmission configuration information is indicated by the first signaling, where X is greater than or equal to Y; and/or when Y is equal to 1, second signaling used for indicating a correspondence between the transmission configuration information and the timing advance information is in a default state.

Manner three: the second transmission node transmits, a quantity T of maximum different timing advance information supported by the second transmission node for a number Q of transmission links transmitted by using an overlapping resource, to the first transmission node through report signaling, where Q and T are integers greater than or equal to 1; and/or if the second transmission node does not support that the Q transmission links transmitted by using the overlapping resource are configured with different timing configuration information, then T is equal to 1 by default and the report signaling is in the default state.

In an embodiment, each of the X transmission configuration information includes at least one of: a precoding index, a reference signal for acquiring a space domain transmission configuration, a transmission link index, a time domain transmission resource index, a frequency domain transmission resource index, a space domain transmission resource index, a beam index, a transmission mode, or a cyclic shift cyclic prefix (CP) configuration. The reference signal for acquiring the space domain transmission configuration includes at least one of: a downlink synchronization signal, a broadcast signal, a random access signal, a random access response signal, an uplink sounding reference signal, an uplink data demodulation reference signal, a downlink sounding reference signal, or a downlink data demodulation reference signal.

In an embodiment, when the first transmission node configures the x-th transmission configuration information of the n-th transmission link through third signaling, the timing advance information corresponding to the x-th transmission configuration information of the n-th transmission link is acquired through at least one of following manners.

Manner one: the timing advance information corresponding to the x-th transmission configuration information of the n-th transmission link keeps unchanged in one of following conditions: a same reference for determining a space domain transmission configuration exists for the x-th transmission configuration information configured through the first signaling and used for the n-th transmission link and the x-th transmission configuration information configured through the third signaling and used for the n-th transmission link; the x-th transmission configuration information configured through the first signaling and used for the n-th transmission link is a reference for a space domain transmission configuration in the x-th transmission configuration information configured through the third signaling and used for the n-th transmission link; or the x-th transmission configuration information configured through the third signaling and used for the n-th transmission link is a reference for a space domain transmission configuration in the x-th transmission configuration information configured through the first signaling and used for the n-th transmission link.

Manner two: the timing advance information corresponding to the x-th transmission configuration information of the n-th transmission link is changed to timing advance information corresponding to the x-th transmission configuration information configured through the third signaling and used for the n-th transmission link.

Manner three: the timing advance information corresponding to the x-th transmission configuration information of the n-th transmission link is configured through the third signaling.

Manner four: the timing advance information corresponding to the x-th transmission configuration information of the n-th transmission link is configured through fourth signaling.

In an embodiment, when the first transmission node configures, through fifth signaling, the timing advance information for the X transmission configuration information corresponding to the specified n-th transmission link, the timing advance information configured for the X transmission configuration information corresponding to the n-th transmission link is acquired through at least one of following manners.

Manner one: the timing advance information corresponding to the X transmission configuration information corresponding to the n-th transmission link is changed to the timing advance information configured through the fifth signaling and used for the X transmission configuration information corresponding to the n-th transmission link.

Manner two: the timing advance information corresponding to the X transmission configuration information corresponding to the n-th transmission link is composed of specified timing advance information and the timing advance information configured through the fifth signaling, and the manner two includes at least one of: for an overlapping portion between the timing advance information configured for the X transmission configuration information corresponding to the specified n-th transmission link and the timing advance information configured through the fifth signaling, the timing advance information configured through the fifth signaling is adopted; for a content which is not contained in the timing advance information configured for the X transmission configuration information corresponding to the specified n-th transmission link, the timing advance information configured through the fifth signaling is adopted; or when the timing advance information configured for the X transmission configuration information corresponding to the specified n-th transmission link only contains a timing advance index, a timing advance value corresponding to the timing advance index is given by the timing advance information configured by the first transmission node through the fifth signaling and corresponding to the X transmission configuration information corresponding to the n-th transmission link.

It should be noted that the step in which the timing advance information is configured for the X transmission configuration information corresponding to the specified n-th transmission link may be that: timing advance configuration information obtained by combining manners of acquiring the timing advance information corresponding to the x-th transmission configuration information of the n-th transmission link information when being configured through the first signaling and/or when the first transmission node configures, through the third signaling, for the x-th transmission configuration information of the n-th transmission link.

In an embodiment, in a case of a preset situation of the timing advance information corresponding to the x-th transmission configuration information of the n-th transmission link, the timing advance information corresponding to the x-th transmission configuration information of the n-th transmission link is acquired through at least one of following manners.

Manner one: the timing advance information corresponding to the x-th transmission configuration information of the n-th transmission link is the same as the timing advance information corresponding to the transmission configuration information with the minimum index or the maximum index among the X transmission configuration information corresponding to the n-th transmission link.

Manner two: the timing advance information corresponding to the x-th transmission configuration information of the n-th transmission link is consistent with timing advance information acquired in an initial access.

Manner three: the timing advance information corresponding to the x-th transmission configuration information of the n-th transmission link is timing advance information corresponding to a reference signal for acquiring a space domain transmission configuration in the x-th transmission configuration information of the n-th transmission link.

Manner four: the timing advance information corresponding to the x-th transmission configuration information of the n-th transmission link is indicated through sixth signaling which is used for scheduling the n-th transmission link to be transmitted according to a x-th transmission configuration.

Manner five: the timing advance information corresponding to the x-th transmission configuration information of the n-th transmission link is the same as reference signal timing advance information corresponding to a reference signal index indicated in the sixth signaling which is used for scheduling the n-th transmission link to be transmitted according to the x-th transmission configuration, where the reference signal is used for acquiring the space domain transmission configuration.

Manner six: the timing advance information corresponding to the x-th transmission configuration information of the n-th transmission link is the same as timing advance information corresponding to a transmission link which uses an overlapping resource with the n-th transmission link and has a higher priority than the n-th transmission link.

It should be noted that the preset situation includes but is not limited to: default, or unconfigured, or missing, or not in effect, etc.

In an embodiment, timing advance information corresponding to the Q transmission links transmitted using the overlapping resource is acquired through at least one of following manners.

Manner one: if the timing advance information is different between the transmission links using the overlapping resource, then the second transmission node transmits, according to timing advance information corresponding to a transmission link with a highest priority in the transmission links, only the transmission link with the highest priority among the transmission links.

Manner two: if the timing advance information is different between the transmission links using the overlapping resource, then the timing advance information corresponding to the transmission links is a maximum value, a minimum value or a mean value of the timing advance information corresponding to the multiple transmission links.

Manner three: if the timing advance information is different between the transmission links using the overlapping resource, then the timing advance information corresponding to the transmission links is the timing advance information corresponding to the transmission link with the highest priority among the transmission links.

Manner four: if the timing advance information is different between the X transmission configurations of the n-th transmission link using the overlapping resource, then the second transmission node transmits the n-th transmission link according to a transmission configuration with a highest priority among the X transmission configurations.

Manner five: if the timing advance information is different between the X transmission configurations of the n-th transmission link using the overlapping resource, then the timing advance information corresponding to the X transmission configurations is a maximum value, a minimum value or a mean value of the corresponding timing advance information.

Manner six: if the timing advance information is different between the X transmission configurations of the n-th transmission link using the overlapping resource, then the timing advance information corresponding to the X transmission configurations is timing advance information corresponding to the transmission configuration with the highest priority among the X transmission configurations.

Manner seven: the second transmission node transmits Z transmission links according to a priority order, where Z is greater than or equal to 1, Z is less than or equal to Q, and a total number of different timing advance information corresponding to the Z transmission links is less than or equal to T, where T is a maximum total quantity of configurations of a timing advance information supported by the second transmission node.

In an embodiment, in a case of determining that the n-th transmission link is transmitted according to a x-th transmission configuration, timing advance information corresponding to a number S of reference signals for acquiring a space domain transmission configuration is acquired through at least one of following manners, where S is an integer greater than or equal to 1.

Manner one: if the x-th transmission configuration corresponding to the n-th transmission link is a codebook-based transmission, then the timing advance information is different between the S reference signals.

Manner two: if the x-th transmission configuration corresponding to the n-th transmission link is a non-codebook-based transmission, then the timing advance information is consistent between the S reference signals, and the timing advance information is a maximum value, a minimum value or a mean value of the timing advance information corresponding to the S reference signals.

Manner three: if the S reference signals are divided into a number F of groups, then timing advance information is consistent between $S_f$ reference signals belonging to a same group, and the timing advance information is a maximum value, a minimum value or a mean value of the timing advance information corresponding to the $S_f$ reference signals, where F is greater than or equal to 1, and $S_f$ is a subset of S (i.e., $S_f \leq S$).

Manner four: if the S reference signals are divided into the F groups, then the timing advance information corresponding to the $S_f$ reference signals belonging to the same group is configured independently through signaling, where F is greater than or equal to 1.

Manner five: if the S reference signals are divided into the F groups, then the timing advance information corresponding to the $S_f$ reference signals belonging to the same group is configured uniformly through signaling for indicating grouping, where F is greater than or equal to 1.

The use of the overlapping resource by transmission links includes at least one of following conditions: condition one: time domain resources allocated for multiple transmission links occupy a same time domain resource unit; condition two: frequency domain resources allocated for the multiple transmission links occupy a same frequency domain resource unit; condition three: space domain resources allocated for the multiple transmission links occupy a same space domain resource unit; condition four: time domain resources allocated by multiple transmission configurations corresponding to the n-th transmission link at least occupy a same time domain resource unit; condition five: frequency domain resources allocated by the multiple transmission configurations corresponding to the n-th transmission link at least occupy a same frequency domain resource unit; or condition six: space domain resources allocated by the multiple transmission configurations corresponding to the n-th transmission link at least occupy a same space domain resource unit.

In an embodiment, timing advance information corresponding to Q transmission links using adjacent resources is acquired through one of following manners.

Manner one: if the timing advance information is different between transmission links using the adjacent resources, then the second transmission node transmits, according to timing advance information corresponding to a transmission link with a highest priority among multiple transmission links, only the transmission link with the highest priority among the multiple transmission links.

Manner two: if the timing advance information is different between the transmission links using the adjacent resources, then the timing advance information corresponding to the multiple transmission links is a maximum value, a minimum value or a mean value of the timing advance information corresponding to the multiple transmission links.

Manner three: if the timing advance information is different between the transmission links using the adjacent resources, then the timing advance information corresponding to the multiple transmission links is timing advance information corresponding to the transmission link with the highest priority among the multiple transmission links.

Manner four: if the timing advance information is different between the X transmission configurations of the n-th transmission link using the adjacent resources, then the second transmission node transmits the n-th transmission link according to the transmission configuration with the highest priority in the X transmission configurations.

Manner five: if the timing advance information is different between the X transmission configurations of the n-th transmission link using the adjacent resources, then the timing advance information corresponding to the X transmission configurations is a maximum value, a minimum value, or a mean value of the corresponding timing advance information.

Manner six: if the timing advance information is different between the X transmission configurations of the n-th transmission link using the adjacent resources, then the timing advance information corresponding to the X transmission configurations is the timing advance information corresponding to the transmission configuration with the highest priority among the X transmission configurations.

Manner seven: if, between two transmission links occupying adjacent time domain resources, timing advance information of a previous transmission link is not less than timing advance information of a subsequent transmission link, then the timing advance information of the two transmission links keeps unchanged.

Manner eight: if, between two transmission links occupying adjacent time domain resources, timing advance information of a previous transmission link is less than timing advance information of a subsequent transmission link, but an interval $k_t$ between the adjacent time domain resources is not less than a threshold $k_0^t$, then the timing advance information of the two transmission links keeps unchanged.

Manner nine: if, between two transmission links occupying adjacent time domain resources, timing advance information of a previous transmission link is less than timing advance information of a subsequent transmission link, then the transmission of the subsequent link is abandoned.

Manner ten: if, between two transmission configurations of the n-th transmission link occupying adjacent time domain resources, timing advance information of a previous transmission configuration is not less than timing advance information of a subsequent transmission configuration, then the timing advance information of the two transmission configurations keeps unchanged.

Manner eleven: if, between two transmission configurations of the n-th transmission link occupying adjacent time domain resources, timing advance information of a previous transmission configuration is less than timing advance information of a subsequent transmission configuration, but an interval $k_t$ between the adjacent time domain resources is not less than a threshold $k_0^t$, then the timing advance information of the two transmission configurations keeps unchanged.

Manner twelve: if, between two transmission configurations of the n-th transmission link occupying adjacent time domain resources, timing advance information of a transmission configuration of a previous transmission link is less than timing advance information of a transmission configuration of a subsequent transmission link, then the transmission of the n-th transmission link configured according to the subsequent transmission configuration is abandoned.

The use of the adjacent resources by the transmission link includes at least one of following conditions: condition one: a time domain resource interval $k_t$ allocated for the multiple transmission links is greater than or equal to 0; condition two: a frequency domain resource interval $k_f$ allocated for the multiple transmission links is greater than or equal to 0; condition three: a space domain resource interval $k_s$ allocated for the multiple transmission links is greater than or equal to 0; condition four: the time domain resource interval $k_t$ allocated by multiple transmission configurations corresponding to the n-th transmission link is greater than or equal to 0; condition five: the frequency domain resource interval $k_f$ allocated by the multiple transmission configurations corresponding to the n-th transmission link is greater than or equal to 0; or condition six: the space domain resource interval $k_s$ allocated by the multiple transmission configurations corresponding to the n-th transmission link is greater than or equal to 0.

In an embodiment, the threshold $k_0^t$ corresponding to the interval of the adjacent time domain resources is determined through at least one of following manners.

Manner one: the threshold $k_0^t$ is determined by a capability of the second transmission node.

Manner two: the threshold $k_0^t$ is determined by a predefined rule including at least one of following components: a component one, which is a difference value or an absolute value of the difference value between the timing advance information of the previous transmission link and the timing advance information of the subsequent transmission link in the two transmission links occupying the adjacent time domain resources; a component two, which is a difference value or an absolute value of the difference value between the timing advance information of the subsequent transmission link and the timing advance information of the previous transmission link in the two transmission links occupying the adjacent time domain resources; or a third component, which is time for the second transmission node to perform timing advance processing according to the timing advance information.

Manner three: if sub-carrier intervals corresponding to the adjacent time domain resources are different, the threshold $k_0^t$ uses a time domain unit corresponding to a maximum sub-carrier interval as a unit.

Manner four: the threshold $k_0^t$ is indicated by using a system minimum time unit as a unit.

Manner five: the threshold $k_0^t$ is indicted by using a minimum configuration step size of the timing advance information as a unit.

Manner six: the threshold $k_0^t$ is indicated by using a time unit as a unit.

In an embodiment, the signaling (also including the first signaling to the sixth signaling) includes one of: radio resource control (RRC) signaling; media access control (MAC) signaling; downlink control information (DCI) signaling; a combination of the RRC signaling and the MAC signaling; or any combination of the RRC signaling, the MAC signaling and the DCI signaling.

In an embodiment, the priority is determined through at least one of following manners.

Manner one: an aperiodic uplink sounding reference signal has a priority to a semi-continuous uplink sounding reference signal, and the semi-continuous uplink sounding reference signal has a priority to a periodic uplink sounding reference signal.

Manner two: a reference signal for antenna switching has a priority to a reference signal for acquisition of uplink channel information, and the reference signal for acquisition of the uplink channel information has a priority to a reference signal for uplink beam training.

Manner three: a short physical uplink link control channel (PUCCH) has a priority to a long PUCCH.

Manner four: the short PUCCH has a priority to a physical uplink shared channel (PUSCH), and the PUSCH has a priority to the long PUCCH.

Manner five: a PUCCH used for reporting ACK/NACK has a priority to an uplink sounding reference signal.

Manner six: the PUSCH has a priority to the uplink sounding reference signal.

Manner seven: a PUSCH bearing downlink channel information has a priority to a PUSCH only bearing uplink data.

Manner eight: the PUSCH has a priority to a PUCCH only bearing the downlink channel information.

Manner nine: the PUCCH used for reporting ACK/NACK has a priority to the PUSCH.

Manner ten: the aperiodic uplink sounding reference signal has a priority to the PUCCH only bearing the downlink channel information, and the PUCCH only bearing the downlink channel information has a priority to the semi-continuous uplink sounding reference signal.

Manner eleven: a PUCCH/PUSCH related to bearing of a service with high quality of service (QoS) has a priority to a PUCCH/PUSCH related to bearing of a service with low QoS.

Manner twelve: a PUSCH configured by adopting a modulation coding scheme (MCS)/channel quality (CQI) based on a low block error rate (BLER) has a priority to a PUSCH configured by adopting the MCS/CQI based on a high BLER.

Manner thirteen: a low-delay high-reliability service has a priority to a broadband data service.

Manner fourteen: in a same link, a transmission configuration with a low index has a priority to a transmission configuration with a high[[low]] transmission configuration index.

Manner H15: a transmission link with a low transmission link index has a priority to a transmission link with a high transmission link index.

In this embodiment, a configuration method for timing advance information is further provided. FIG. 2 is another flowchart of a configuration method for time advance information according to an embodiment of the present disclosure. As shown in FIG. 2, the process includes steps described below.

In step S202, a second transmission node receives a number I of signaling transmitted by a first transmission node.

In step S204, the second transmission node acquires, through the signaling, timing advance information corresponding to a number N of transmission links from the second transmission node to a number M of first transmission nodes, where I, M and N are integers greater than or equal to 1.

In an embodiment, the first transmission node may be a base station, and the second transmission node may be a terminal, but is not limited to this.

Through the above steps S202 to S204, the second transmission node receives the I signaling transmitted by the first transmission node; the second transmission node acquires, through the signaling, the timing advance information corresponding to the N transmission links from the second transmission node to the M first transmission nodes, where I, M and N are integers greater than or equal to 1. That is, the first transmission node configures, through the signaling, timing advance information required by the second transmission node for data transmission; and the second transmission node finishes configuring timing advance information from the second transmission node to the first transmission node according to the timing advance information indicated by the signaling, so as to address low transmission performance caused by the use of single TA in multi-beam/multi-station transmission in the related art, and the technical effect of improving the transmission performance is achieved.

In an embodiment, the step in which the second transmission node acquires, through the signaling, the timing advance information corresponding to the N transmission links from the second transmission node to the M first transmission nodes includes: the second transmission node acquires, through first signaling, timing advance information corresponding to a number X of transmission configuration information corresponding to a n-th transmission link, where n and X are integers greater than or equal to 1.

The step in which the second transmission node acquires, through the first signaling, the timing advance information corresponding to the X transmission configuration information corresponding to the n-th transmission link includes at least one of following manners.

Manner one: the second transmission node jointly acquires, through the first signaling, x-th transmission configuration information and timing advance information corresponding to the x-th transmission configuration information, where x is an integer greater than or equal to 1; and/or if the second transmission node only acquires timing advance information of transmission configuration information with a minimum or maximum index among the X transmission configuration information corresponding to the n-th transmission link, then the second transmission node uses a same timing advance information for the X transmission configuration information, where the timing advance information is the timing advance information of the transmission configuration information with the minimum or maximum index in the acquired X transmission configuration information.

Manner two: the second transmission node acquires, through the first signaling, a number Y of timing advance information corresponding to the X transmission configuration information, where X is greater than or equal to Y, and the second transmission node acquires a correspondence between the X transmission configuration information and the Y timing advance information through second signaling; and/or, if the second transmission node does not receive the second signaling, then a same timing advance information is adopted for the X transmission configuration information by the second transmission node, where the timing advance information is timing advance information acquired by the second transmission node through the first signaling.

Manner three: the second transmission node reports a quantity T of maximum different timing advance information supported by the second transmission node for a number Q of transmission links transmitted by using an overlapping resource through the signaling, where Q and T are integers greater than or equal to 1; and/or if the second transmission node does not support that the Q transmission links transmitted by using the overlapping resource are configured with different timing advance information, then T is equal to 1 by default and report signaling of the second transmission node is in a default state.

In an embodiment, when the second transmission node receives third signaling transmitted by the first transmission node and used for configuring the x-th transmission configuration information of the n-th transmission link, the second transmission node acquires the timing advance information corresponding to the x-th transmission configuration information of the n-th transmission link through at least one of following manners.

Manner one: the timing advance information corresponding to the x-th transmission configuration information of the n-th transmission link keeps unchanged in one of following conditions: a same reference for determining a space domain transmission configuration exists for the x-th transmission configuration information configured through the first signaling and used for the n-th transmission link and the x-th transmission configuration information configured through the third signaling and used for the n-th transmission link; the x-th transmission configuration information configured through the first signaling and used for the n-th transmission link is a reference for a space domain transmission configuration in the x-th transmission configuration information configured through the third signaling and used for the n-th transmission link; or the x-th transmission configuration information configured through the third signaling and used for the n-th transmission link is a reference for a space domain transmission configuration in the x-th transmission configuration information configured through the first signaling and used for the n-th transmission link.

Manner two: the second transmission node determines, according to the timing advance information corresponding to the x-th transmission configuration information of the n-th transmission link configured through the third signaling, the timing advance information corresponding to the x-th transmission configuration information of the n-th transmission link.

Manner three: the second transmission node acquires, through the third signaling, the timing advance information corresponding to the x-th transmission configuration information of the n-th transmission link.

Manner four: the second transmission node acquires, through fourth signaling, the timing advance information corresponding to the x-th transmission configuration information of the n-th transmission link.

In an embodiment, when the second transmission node receives fifth signaling, where the fifth signaling is used for configuring timing advance information corresponding to X transmission configuration information of a specified n-th transmission link, the second transmission node acquires timing advance information corresponding to the X transmission configuration information of the n-th transmission link through at least one of following manners.

Manner one: the second transmission node determines the timing advance information corresponding to the X transmission configuration information of the n-th transmission link according to the fifth signaling.

Manner two: the second transmission node jointly determining, according to specified timing advance information and timing advance information configured by the fifth signaling, the timing advance information corresponding to the X transmission configuration information of the n-th transmission link, includes at least one of: for an overlapping portion between the specified timing advance information and the timing advance information configured by the fifth signaling, the timing advance information configured by the fifth signaling is adopted; for a content which is not contained in the specified timing advance information, the timing advance information configured by the fifth signaling is adopted; or when the timing advance information configured for the X transmission configuration information corresponding to the specified n-th transmission link only contains a timing advance index, a timing advance value corresponding to the index is given by the timing advance information corresponding to the X transmission configuration information configured by the first transmission node through the fifth signaling and used for the n-th transmission link.

In an embodiment, if the second transmission node does not receive signaling transmitted by the first transmission node and used for configuring the timing advance information corresponding to the x-th transmission configuration information of the n-th transmission link, or if the signaling does not contain timing advance information, or if the configured timing advance information has not yet taken effect, then the second transmission node acquires the timing advance information corresponding to the x-th transmission configuration information of the n-th transmission link through at least one of following manners.

Manner one: the second transmission node uses, for the x-th transmission configuration information corresponding the n-th transmission link, timing advance information same as the timing advance information corresponding to the transmission configuration information with the minimum index or the maximum index among the X transmission configuration information corresponding to the n-th transmission link.

Manner two: the second transmission node uses, for the x-th transmission configuration information corresponding to the n-th transmission link, timing advance information same as timing advance information acquired in an initial access.

Manner three: the second transmission node uses, for the x-th transmission configuration information corresponding to the n-th transmission link, timing advance information same as timing advance information corresponding to a reference signal for acquiring a space domain transmission configuration in the x-th transmission configuration information of the n-th transmission link.

Manner four: the second transmission node determines, according to an instruction of sixth signaling which is used for scheduling the n-th link to be transmitted according to the x-th transmission configuration, timing advance information corresponding to the x-th transmission configuration information of the n-th transmission link.

Manner five: the second transmission node uses, for the x-th transmission configuration information of the n-th transmission link, timing advance information same as timing advance information of reference signal corresponding to a reference signal index indicated in the sixth signaling which is used for scheduling the n-th link to be transmitted according to the x-th transmission configuration, where the reference signal is used for acquiring the space domain transmission configuration.

Manner six: the second transmission node uses, for the x-th transmission configuration information of the n-th transmission link, timing advance information same as timing advance information of a transmission link which uses an overlapping resource with the transmission link and has a higher priority than the transmission link.

In an embodiment, timing advance information corresponding to the Q transmission links transmitted using the overlapping resource is acquired through at least one of following manners.

Manner one: if the timing advance information is different between the transmission links using the overlapping resource, then the second transmission node transmits, according to timing advance information corresponding to a transmission link with a highest priority in the transmission links, only the transmission link with the highest priority among the transmission links.

Manner two: if the timing advance information is different between the transmission links using the overlapping resource, then the second transmission node transmits, according to a maximum value, a minimum value or a mean value of the timing advance information corresponding to the multiple transmission links, the multiple transmission links.

Manner three: if the timing advance information is different between the transmission links using the overlapping resource, then the second transmission node transmits, according to the timing advance information corresponding to the transmission link with the highest priority among the multiple transmission links, the multiple transmission links.

Manner four: if the timing advance information is different between the X transmission configurations of the n-th transmission link using the overlapping resource, then the second transmission node transmits the n-th transmission link according to a transmission configuration with the highest priority among the X transmission configurations.

Manner five: if the timing advance information is different between the X transmission configurations of the n-th transmission link using the overlapping resource, then the second transmission node transmits, according to the X transmission configurations and a maximum value, a minimum value or a mean value of the timing advance information corresponding to the X transmission configurations, the n-th transmission link.

Manner six: if the timing advance information is different between the X transmission configurations of the n-th transmission link using the overlapping resource, then the second transmission node transmits, according to the X transmission configurations and timing advance information corresponding to the transmission configuration with the highest priority in the X transmission configurations, the n-th transmission link.

Manner seven: the second transmission node transmits Z transmission links according to a priority order, where Z is greater than or equal to 1, Z is less than or equal to Q, and a total number of different timing advance information corresponding to the Z transmission links is less than or equal to T, where T is a maximum total quantity of configurations of a timing advance information supported by the second transmission node.

In an embodiment, in a case of determining that the second transmission node transmits the n-th transmission link according to a x-th transmission configuration, timing advance information corresponding to a number S of reference signals for acquiring a space domain transmission configuration is acquired through at least one of following manners, where S is an integer greater than or equal to 1.

Manner one: if the x-th transmission configuration corresponding to the n-th transmission link is a codebook-based transmission, then the second transmission node transmits the S reference signals according to different timing advance information.

Manner two: if the x-th transmission configuration corresponding to the n-th transmission link is a codebook-based transmission, then the second transmission node transmits the S reference signals according to the same timing advance information, and the timing advance information is a maximum value, a minimum value or a mean value of the timing advance information corresponding to the S reference signals.

Manner three: if the S reference signals are divided into a number F of groups, then the second transmission node transmits $S_f$ reference signals belonging to a same group according to the same timing advance information, and the timing advance information is a maximum value, a minimum value or a mean value in the timing advance information corresponding to the $S_f$ reference signals.

Manner four: if the S reference signals are divided into the F groups, then the second transmission node acquires timing advance information of each reference signal according to the timing advance information corresponding to the $S_f$ reference signals belonging to the same group, and where F is greater than or equal to 1.

Manner five: if the S reference signals are divided into the F groups, then the second transmission node acquires the timing advance information corresponding to the $S_f$ reference signals belonging to the same group according to a grouping signaling instruction, and where F is greater than or equal to 1.

The use of the overlapping resource by transmission links includes at least one of following conditions: condition one: time domain resources allocated for multiple transmission links occupy a same time domain resource unit; condition two: frequency domain resources allocated for the multiple transmission links occupy a same frequency domain resource unit; condition three: space domain resources allocated for the multiple transmission links occupy a same space domain resource unit; condition four: time domain resources allocated by multiple transmission configurations corresponding to the n-th transmission link at least occupy a same time domain resource unit; condition five: frequency domain resources allocated by the multiple transmission configurations corresponding to the n-th transmission link at least occupy a same frequency domain resource unit; or condition six: space domain resources allocated by the multiple transmission configurations corresponding to the n-th transmission link at least occupy a same space domain resource unit.

In an embodiment, timing advance information corresponding to Q transmission links using adjacent resources is acquired through one of following manners.

Manner one: if the timing advance information is different between the transmission links using the adjacent resources, then the second transmission node transmits, according to timing advance information corresponding to a transmission link with a highest priority among multiple transmission links, only the transmission link with the highest priority among the multiple transmission links.

Manner two: if the timing advance information is different between the transmission links using the adjacent resources, then the second transmission node transmits, according to a maximum value, a minimum value or a mean value of the timing advance information corresponding to the multiple transmission links, the multiple transmission links.

Manner three: if the timing advance information is different between the transmission links using the adjacent resources, then the second transmission node transmits the multiple transmission links according to timing advance information corresponding to the transmission link with the highest priority among the multiple transmission links.

Manner four: if the timing advance information is different between the X transmission configurations of the n-th transmission link using the adjacent resources, then the second transmission node transmits the n-th transmission link according to the timing advance information corresponding to the transmission configuration with the highest priority in the X transmission configurations and according to the transmission configuration with the highest priority in the X transmission configurations.

Manner five: if the timing advance information is different between the X transmission configurations of the n-th transmission link using the adjacent resources, then the second transmission node transmits the n-th transmission link according to the X transmission configurations and a maximum value, a minimum value, or a mean value of the timing advance information corresponding to the X transmission configurations.

Manner six: if the timing advance information is different between the X transmission configurations of the n-th transmission link using the adjacent resources, then the second transmission node transmits the n-th transmission link according to the X transmission configurations and timing advance information corresponding to the transmission configuration with a highest priority in the X transmission configurations.

Manner seven: if, between two transmission links occupying adjacent time domain resources, timing advance information of a previous transmission link is not less than timing advance information of a subsequent transmission link, then the timing advance information of the two transmission links keeps unchanged.

Manner eight: if, between two transmission links occupying adjacent time domain resources, timing advance information of a previous transmission link is less than timing advance information of a subsequent transmission link, but an interval $k_t$ between the adjacent time domain resources is not less than a threshold $k_0^t$, then the timing advance information of the two transmission links keeps unchanged.

Manner nine: if, between two transmission links occupying adjacent time domain resources, timing advance information of a previous transmission link is less than timing advance information of a subsequent transmission link, then the second transmission node abandons the transmission of the subsequent link.

Manner ten: if, between two transmission configurations of the n-th transmission link occupying adjacent time domain resources, timing advance information of a previous transmission configuration is not less than timing advance information of a subsequent transmission configuration, then the timing advance information of the two transmission configurations keeps unchanged.

Manner eleven: if, between two transmission configurations of the n-th transmission link occupying adjacent time domain resources, timing advance information of a previous transmission configuration is less than timing advance information of a subsequent transmission configuration, but an interval $k_t$ between the adjacent time domain resources is not less than a threshold $k_0^t$, then the timing advance information of the two transmission configurations keeps unchanged.

Manner twelve: if between two transmission configurations of the n-th transmission link occupying adjacent time domain resources, timing advance information of a transmission configuration of a previous transmission link is less than timing advance information of a transmission configuration of a subsequent transmission link, then the second transmission node abandons the transmission of the n-th transmission link configured according to the subsequent transmission configuration.

The use of the adjacent resources by the transmission link includes at least one of following conditions: condition one: a time domain resource interval $k_t$ allocated for the multiple transmission links is greater than or equal to 0; condition two: a frequency domain resource interval $k_f$ allocated for the multiple transmission links is greater than or equal to 0; condition three: a space domain resource interval $k_s$ allocated for the multiple transmission links is greater than or equal to 0; condition four: the time domain resource interval $k_t$ allocated by multiple transmission configurations corresponding to the n-th transmission link is greater than or equal to 0; condition five: the frequency domain resource interval $k_f$ allocated by the multiple transmission configurations corresponding to the n-th transmission link is greater than or equal to 0; or condition six: the space domain resource interval $k_s$ allocated by the multiple transmission configurations corresponding to the n-th transmission link is greater than or equal to 0.

In an embodiment, the threshold $k_0^t$ corresponding to the interval of the adjacent time domain resources is determined through at least one of following manners.

Manner one: the threshold $k_0^t$ is determined by a capability of the second transmission node.

Manner two: the threshold $k_0^t$ is determined by a predefined rule including at least one of following components: a component one, which is a difference value or an absolute value of the difference value between the timing advance information of the previous transmission link and the timing advance information of the subsequent transmission link in the two transmission links occupying the adjacent time domain resources; a component two, which is a difference value or an absolute value of the difference value between the timing advance information of the subsequent transmission link and the timing advance information of the previous transmission link in the two transmission links occupying the adjacent time domain resources; or a third component, which is time for the second transmission node to perform timing advance processing according to the timing advance information.

Manner three: if sub-carrier intervals corresponding to the adjacent time domain resources are different, then the threshold $k_0^t$ uses a time domain unit corresponding to a maximum sub-carrier interval as a unit.

Manner four: the threshold $k_0^t$ is indicated by using a system minimum time unit as a unit.

Manner five: the threshold $k_0^t$ is indicated by using a minimum configuration step size of the timing advance information as a unit.

Manner six: the threshold $k_0^t$ is indicated by using a time unit as a unit.

This embodiment is exemplified below in connection with specific examples.

First, in following examples, the terms involved are explained with reference to following definitions.

The timing advance information may be one of TA advance information, or subframe/symbol/half-frame start position information; this type of information may be represented by absolute time or relative offset information.

The same timing advance configuration information among the transmission links refers to one of: the transmission links share a same uplink TA advance reference point; the transmission links share a same uplink TA advance reference advance value; the transmission links share a same subframe/symbol/half-frame start position; or the transmission links share a same subframe/symbol/half-frame start position offset.

The above-described measurement may include one of: reception of a measurement signal, transmission of the measurement signal, and feedback of a measurement result.

The above-described time unit number refers to one of: an index of a symbol/slot/subframe/frame occupied by signal transmission; this index may be an absolute/or relative index.

The reference signal may be one of: a joint index of a time domain/frequency domain/code domain or above parameters occupied by the reference signal, a reference signal port index, a reference signal port grouping index, or a reference signal resource grouping index.

The transmission mode may be one of: codebook-based transmission/non-codebook transmission/single antenna transmission/diversity transmission/open-loop transmission/semi-open-loop transmission.

The transmission link may be one of: a data transmission channel; a control transmission channel; a random access channel; a modulation-demodulation signal; a phase noise compensation signal; a sounding reference signal; a combination of a time division/frequency division/space division between channels; or a combination of time division/frequency division/space division between a channel and a signal.

The space domain transmission configuration may be one of: a radio frequency channel used for receiving downlink data and/or receiving uplink data, an antenna port, a beam, a spatial filter, a spatial quasi-co-location relationship, and a precoding.

The same airspace transmission configuration between the transmissions refers to one of: when a target transmission and a reference transmission are co-directional transmissions, the target transmission and the reference transmission are applicable to a same radio frequency channel, and/or antenna port, and/or beam, and/or spatial filter, and/or spatial quasi-co-location relationship to send and receive data; when the target transmission and the reference transmission are different-directional transmissions, the target transmission receives data by using a radio frequency channel, and/or an antenna port, and/or a beam, and/or a spatial filter, and/or a spatial quasi-co-location relationship used for transmitting the data with the reference transmission; and when the target transmission and the reference transmission are different-directional transmission, the target transmission uses a radio frequency channel, and/or an antenna port, and/or a beam, and/or a spatial filter, and/or a spatial quasi-co-location relationship for receiving data with the reference transmission to transmit the data.

The reference signal port grouping index refers to an index used for distinguishing different groups after grouping reference signal ports involved in transmission according to a specific reference signal port grouping rule.

The reference signal port grouping rule may be one of: grouping according to the quasi-co-location relationship (QCL) of the reference signal; grouping according to the high-level signaling configuration; or grouping according to resources occupied by each port of the reference signal.

The device parameters may be one of: a radio frequency link label, a radio frequency link number, radio frequency link phase noise, power amplifier, antenna array element characteristics, antenna array characteristics, an antenna sub-array, time offset, frequency offset, etc. The device parameters also include calibration information for the above parameters.

The beam may be one of: a resource (e.g., a sender precoding, a receiver precoding, an antenna port, an antenna weight vector, an antenna weight matrix, etc.) since the beam may be bound on transmission with some time-frequency code resources, the beam may also be a resource index. The beam may also be a transmission (transmit/receive) manner; the transmission manner may include space division multiplexing, frequency domain/time domain diversity and the like.

A quasi-co-location (QCL) relationship of the reference signal refers to a quasi-co-location assumption met between resources (such as time domain and frequency domain) adopted when the reference signals are received and transmitted and antenna ports. Different quasi-co-location assumptions at least correspond to following parameters or parameter subsets: Doppler spread, Doppler translation, delay spread, average delay and average gain, and spatial parameter information. In an embodiment, the spatial parameter further refers to an angle of arrival, a spatial correlation of the received beam, an average latency, and a correlation of time-frequency channel responses (including phase information).

The first transmission node and the second transmission node may be one of: a base station, a terminal, a transmission node, or a relay node and the like.

The present application will be described in detail hereinafter with reference to the accompanying drawings in conjunction with embodiments. It should be noted that the embodiments of the present application and the features of the embodiments may be combined with each other without conflict.

It should be noted that the terms "first," "second," and the like, in the Description and claims of the present application and in the above-described drawings, are used for distinguishing between similar objects and not necessarily for describing a particular order or sequential order.

Example 1

Figure 5:
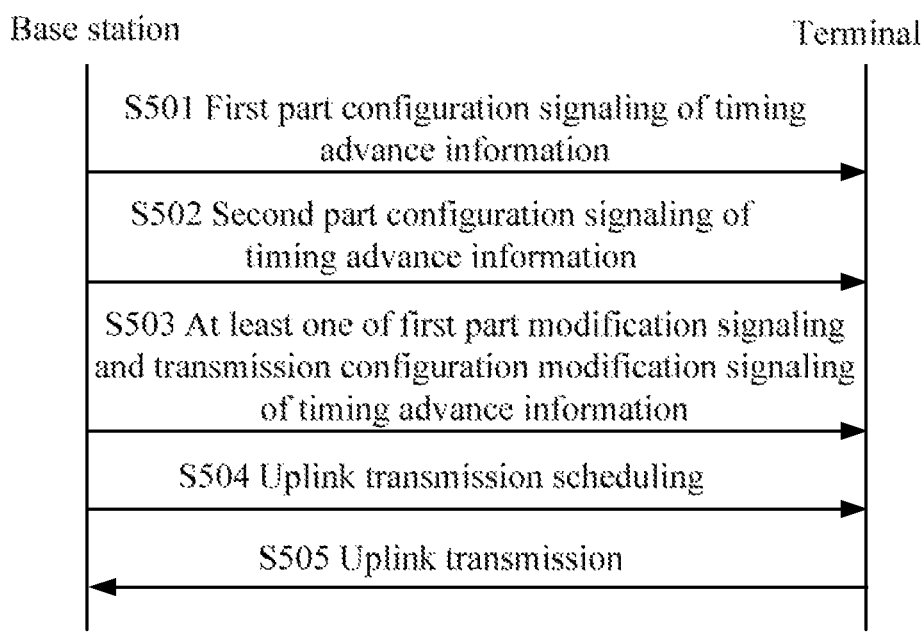
FIG. 5 is a flowchart (three) of a configuration of timing advance information between communication nodes according to an embodiment of the present disclosure.

In this example, a configuration method for time advance information between communication nodes is provided. FIGS. 3 to 5 are different flowcharts of configuration methods for timing advance information between communication nodes according to an embodiment of the present disclosure, respectively, it specifically includes one of following conditions.

In an embodiment, as shown in FIG. 3, the process includes steps described below.

In step S301, a base station transmits timing advance information through signaling.

In step S302, the base station transmits uplink transmission scheduling information.

In step S303, a terminal transmits an uplink transmission link to the base station according to the acquired timing advance information.

In an embodiment, the above-described signaling may be one of RRC signaling, MAC CE signaling, or DCI signaling.

In an embodiment, the timing advance information transmitted in the step S301 may be timing advance information configured for a current transmission link.

In an embodiment, the timing advance information transmitted in the step S301 may be a set of timing advance information for all transmission links.

In an embodiment, the uplink transmission link described above may be one of: an uplink data channel, an uplink control channel, an uplink sounding reference signal, a random access channel, an uplink modulation-demodulation reference signal, one of multiple transmission configurations of one uplink data channel, one of multiple transmission configurations of one uplink control channel, or one of multiple transmission configurations of one uplink sounding reference signal.

In an embodiment, the transmission configuration refers to one of: a precoding index required for uplink transmission, a reference signal used for acquiring a space domain transmission configuration, a transmission link index, a transmission resource index, a beam index, or a transmission mode.

In an embodiment, transmission configuration information of the uplink transmission link may be indicated jointly with corresponding timing advance information by a same signaling.

In an embodiment, the transmission configuration information of the uplink transmission link is indicated by additional signaling.

In an embodiment a relationship between the transmission configuration information of the uplink transmission link and the timing advance information may be indicated by additional signaling.

In an embodiment, the timing advance information includes one of: a timing advance index, a timing advance value, a timing advance value step size, a timing advance value step size index, a timing advance value reference value, or a timing advance value reference index.

In an embodiment, a combination of the timing advance information includes at least one of: {timing advance index, timing advance value}, {timing advance index, timing advance reference index}, {timing advance index, timing advance reference value}, or {timing advance index, timing advance value, timing advance value reference index}.

In an embodiment, for periodic transmissions, signaling which is transmitted by the base station and used for indicating the uplink transmission scheduling information may be default.

In an embodiment, if signaling of information in a configuration method in which the base station is used for configuring uplink timing advance information in the step S301 is defaulted, then the base station may indicate, in uplink scheduling information transmitted in the step S302, timing advance information required by the terminal for transmitting the uplink transmission link.

In an embodiment, if the timing advance information transmitted in the step S301 may be the set of timing advance information for the all transmission links, then the base station may indicate, in the uplink scheduling information transmitted in the step S302, the timing advance information required by the terminal for transmitting the uplink transmission link.

In an embodiment, for an uplink data transmission channel, the timing advance information of the uplink data transmission channel is the same as a reference signal which is indicated in scheduling signaling for scheduling this transmission and used for determining the space domain transmission configuration of the uplink data transmission channel.

In an embodiment, the terminal transmits a respective uplink transmission according to the received timing advance information corresponding to the uplink transmission link.

In an embodiment, when the timing advance information corresponding to the uplink transmission link is incomplete, such as the missing of the timing advance value, the determination of the timing advance value and reference value, the terminal transmits this uplink transmission link according to the timing advance information acquired in an initial access.

In an embodiment, as shown in FIG. 4, the process includes steps described below.

In step S401, a base station transmits a first part of timing advance information through signaling.

In step S402, the base station transmits a second part of the timing advance information through the signaling.

In step S403, the base station transmits uplink transmission scheduling information.

In step S404, a terminal transmits an uplink transmission link to the base station according to the acquired timing advance information.

In an embodiment, the above-described signaling may be one of RRC signaling, MAC CE signaling, or DCI signaling.

In an embodiment, the signaling in the step S401 and the step S402 may be the RRC signaling, the MAC CE signaling, respectively.

In an embodiment, the timing advance information transmitted in the step S401 may be timing advance information configured for a current transmission link.

In an embodiment, the timing advance information transmitted in the step S401 may be a set of timing advance information for all transmission links.

In an embodiment, the timing advance information transmitted in the step S402 may be timing advance information configured for a current transmission link.

In an embodiment, the timing advance information transmitted in the step S402 may be a set of timing advance information for all transmission links.

In an embodiment, if signaling of information in a configuration method in which the base station is used for configuring uplink timing advance information in the step S401 and the step S402 is defaulted, then the base station indicate, in uplink scheduling information transmitted in the step S403, timing advance information required by the terminal for transmitting the uplink transmission link.

In an embodiment, if the timing advance information transmitted in the step S401 and the step S402 may be the set of timing advance information for the all transmission links, then the base station may indicate, in the uplink scheduling information transmitted in the step S403, the timing advance information required by the terminal for transmitting the uplink transmission link.

In an embodiment, the uplink transmission link may be one of: an uplink data channel, an uplink control channel, an uplink sounding reference signal, a random access channel, an uplink modulation-demodulation reference signal, one of multiple transmission configurations of one uplink data channel, one of multiple transmission configurations of one uplink control channel, or one of multiple transmission configurations of one uplink sounding reference signal.

In an embodiment, the transmission configuration refers to one of: a precoding index required for uplink transmission, a reference signal used for acquiring a space domain transmission configuration, a transmission link index, a transmission resource index, a beam index, or a transmission mode.

In an embodiment, the timing advance information includes one of: a timing advance index, a timing advance value, a timing advance value step size, a timing advance value step size index, a timing advance value reference value, or a timing advance value reference index.

In an embodiment, a combination of the timing advance information includes at least one of: {timing advance index, timing advance value}, {timing advance index, timing advance reference index}, {timing advance index, timing advance reference value}, or {timing advance index, timing advance value, timing advance value reference index}.

In an embodiment, a content of the first part of the timing advance information includes one of the timing advance index, the timing advance value reference index, or the timing advance value step length.

In an embodiment, the content of the second part of the timing advance information includes one of the timing advance index, the timing advance value, or the timing advance value reference value.

In an embodiment, a combination of the contents of the first part and the second part of the timing advance information is shown in table 1.

TABLE 1

|  | first part | second part |
| --- | --- | --- |
| combination 1 | timing advance index | timing advance index, timing advance value |
| combination 2 | timing advance index, timing advance reference index | timing advance index, timing advance value, timing advance reference index, timing advance value |
| combination 3 | timing advance index | timing advance value |
| combination 4 | timing advance index, timing advance reference index | timing advance value, timing advance value |
| combination 5 | timing advance index, timing advance value step size | timing advance index, timing advance value, |
| combination 6 | timing advance index, timing advance reference index, timing advance value step size | timing advance index, timing advance value, timing advance reference index, timing advance value |
| combination 7 | timing advance index, timing advance value step size | timing advance value, timing advance reference value |
| combination 8 | timing advance index, timing advance reference index, timing advance value step size | timing advance value, timing advance reference value |
| combination 9 | timing advance index, timing advance value step size index | timing advance index, timing advance value |
| combination 10 | timing advance index, timing advance reference index, timing advance value step size index | timing advance index, timing advance value, timing advance reference index, timing advance value |
| combination 11 | timing advance index, timing advance value step size index | timing advance value, timing advance reference value |
| combination 12 | timing advance index, timing advance reference index, timing advance value step size index | timing advance value, timing advance reference value |

In an embodiment, the timing advance value may be one of: an actual value, or a value in units of a timing advance step size.

In an embodiment, the timing advance value reference value may be one of: an actual value, or a value in units of a timing advance step size.

In an embodiment, contents of the first part and the second part of the timing advance information may be repeated.

Furthermore, when the contents of the first part and the second part are repeated, the timing advance information corresponding to the uplink transmission link adopts the timing advance information configured by the signaling in the second part.

In an embodiment, when the second part of the timing advance information includes a missing content in the first part of the timing advance information, a content in the second part of the timing advance information is adopted as this part of the content.

In an embodiment, when the first part of the timing advance information includes the timing advance index and/or the timing advance reference index, and a timing advance value and/or a timing advance reference value corresponding to the index is included in the second part of the timing advance information, the timing advance value and/or the timing advance reference value is a value acquired according to an index contained in the first part in the second part of the timing advance information.

In an embodiment, if the first part includes the timing advance index and the second part includes a timing index and the timing advance value, then the timing advance value corresponding to the transmission refers to a timing advance value corresponding to an index of the second part that is the same as the index included in the first part.

In an embodiment, if the first part includes the timing advance reference index and the second part includes the timing index and the timing advance reference value, then the timing advance reference value corresponding to the transmission refers to a timing advance value corresponding to an index of the second part that is the same as the index included in the first part.

In an embodiment, if the first part includes the timing advance reference index and the second part includes the timing advance value but does not include the timing advance index, then the timing advance value corresponding to the transmission refers to a value acquired by the advance values contained in the second part, in a sequence or an inverted order or a sequence from large to small or a sequence from small to large, according to the timing advance index contained in the first part.

In an embodiment, if the first part includes the timing advance reference index and the second part includes the timing advance reference value but does not include the timing advance index, then the timing advance reference value corresponding to the transmission refers to a value acquired by the advance values contained in the second part, in a sequence or an inverted order or a sequence from large to small or a sequence from small to large, according to the timing advance reference index contained in the first part.

In an embodiment, if the timing advance step size is included in the first part, then a measurement unit of timing advance data included in the second part is this step size.

In an embodiment, for periodic transmissions, signaling which is transmitted by the base station and used for indicating the uplink transmission scheduling information may be default.

In an embodiment, the terminal transmits a respective uplink transmission according to the received timing advance information corresponding to the uplink transmission link.

In an embodiment, when the timing advance information corresponding to the uplink transmission link is incomplete, such as the missing of the timing advance value, the determination of the timing advance value and reference value, the terminal transmits this uplink transmission link according to the timing advance information acquired in an initial access.

In an embodiment, as shown in FIG. 5, the process includes steps described below.

In step S501, a base station transmits a first part of timing advance information through signaling.

In step S502, the base station transmits a second part of the timing advance information through the signaling.

In step S503, the base station transmits configuration signaling.

In step S504, the base station transmits uplink transmission scheduling information.

In step S505, a terminal transmits an uplink transmission link to the base station according to the acquired timing advance information.

In an embodiment, the signaling may be one of RRC signaling, MAC CE signaling, or DCI signaling.

In an embodiment, the uplink transmission link may be one of: an uplink data channel, an uplink control channel, an uplink sounding reference signal, a random access channel, an uplink modulation-demodulation reference signal, one of multiple transmission configurations of one uplink data channel, one of multiple transmission configurations of one uplink control channel, or one of multiple transmission configurations of one uplink sounding reference signal.

In an embodiment, the transmission configuration refers to one of: a precoding index required for uplink transmission, a reference signal used for acquiring a space domain transmission configuration, a transmission link index, a transmission resource index, a beam index, or a transmission mode.

In an embodiment, the timing advance information transmitted in the step S501 may be timing advance information configured for a current transmission link.

In an embodiment, the timing advance information transmitted in the step S501 may be a set of timing advance information for all transmission links.

In an embodiment, the timing advance information transmitted in the step S502 may be timing advance information configured for a current transmission link.

In an embodiment, the timing advance information transmitted in the step S502 may be a set of timing advance information for all transmission links.

In an embodiment, the configuration signaling transmitted in the step S503 may be reconfigured for the timing advance information sent in the step S501 or the step S502.

In an embodiment, the configuration signaling transmitted in the step S503 may be a modification of the transmission configuration for the transmission link.

In an embodiment, the step S503 and the step S502 may be adjusted sequentially.

In an embodiment, the step S502 may occur simultaneously with the step S503.

In an embodiment, if signaling of information in a configuration method in which the base station is used for configuring uplink timing advance information in the step S501 and the step S502 is defaulted, then the base station may indicate, in the uplink scheduling information transmitted in the step S504, timing advance information required by the terminal for transmitting the uplink transmission link.

In an embodiment, if the timing advance information transmitted in the step S501 and the step S502 may be the set of timing advance information for the all transmission links, then the base station may indicate, in the uplink scheduling information transmitted in the step S504, the timing advance information required by the terminal for transmitting the uplink transmission link.

In an embodiment, if the base station modifies the timing configuration corresponding to the transmission link, then the acquisition of the timing advance information corresponding to the transmission link specifically includes new timing advance configuration information indicated in the modified original timing configuration signaling.

In an embodiment, if the base station modifies the timing configuration corresponding to the transmission link, then the acquisition of the timing advance information corresponding to the transmission link specifically includes a combination of existing timing advance information and new timing advance configuration information indicated in the modified original timing configuration signaling.

In an embodiment, for a semi-continuous uplink reference signal, the base station configures transmission configuration and timing advance information corresponding to the reference signal through the RRC signaling, and then the base station modifies transmission configuration corresponding to the signal through the MAC CE signaling, where the transmission configuration refers to acquisition of a reference signal for transmitting a space domain configuration of this uplink reference signal, and the timing advance information corresponding to the reference signal is configured by the MAC CE signaling.

In an embodiment, for the semi-continuous uplink reference signal, the base station configures the transmission configuration and the timing advance information corresponding to the reference signal through the RRC signaling, and then the base station modifies the transmission configuration corresponding to the signal through the MAC CE signaling, where the transmission configuration refers to acquisition of the reference signal for transmitting the space domain configuration of this uplink reference signal, if a same space domain configuration exists for a reference signal for acquiring the space domain configuration in the modified transmission configuration and a reference signal for acquiring space domain configuration information in the original transmission configuration, the timing advance information corresponding to the reference signal is kept to be unchanged.

In an embodiment, for the semi-continuous uplink reference signal, the base station configures the transmission configuration and the timing advance information corresponding to the reference signal through the RRC signaling, and then the base station modifies the transmission configuration corresponding to the signal through the MAC CE signaling, where the transmission configuration refers to acquisition of the reference signal for transmitting the space domain configuration of this uplink reference signal, then the timing advance information corresponding to the reference signal is consistent with the timing advance information corresponding to the reference signal for acquiring the space domain configuration in a new transmission configuration.

Example 2

Figure 6:
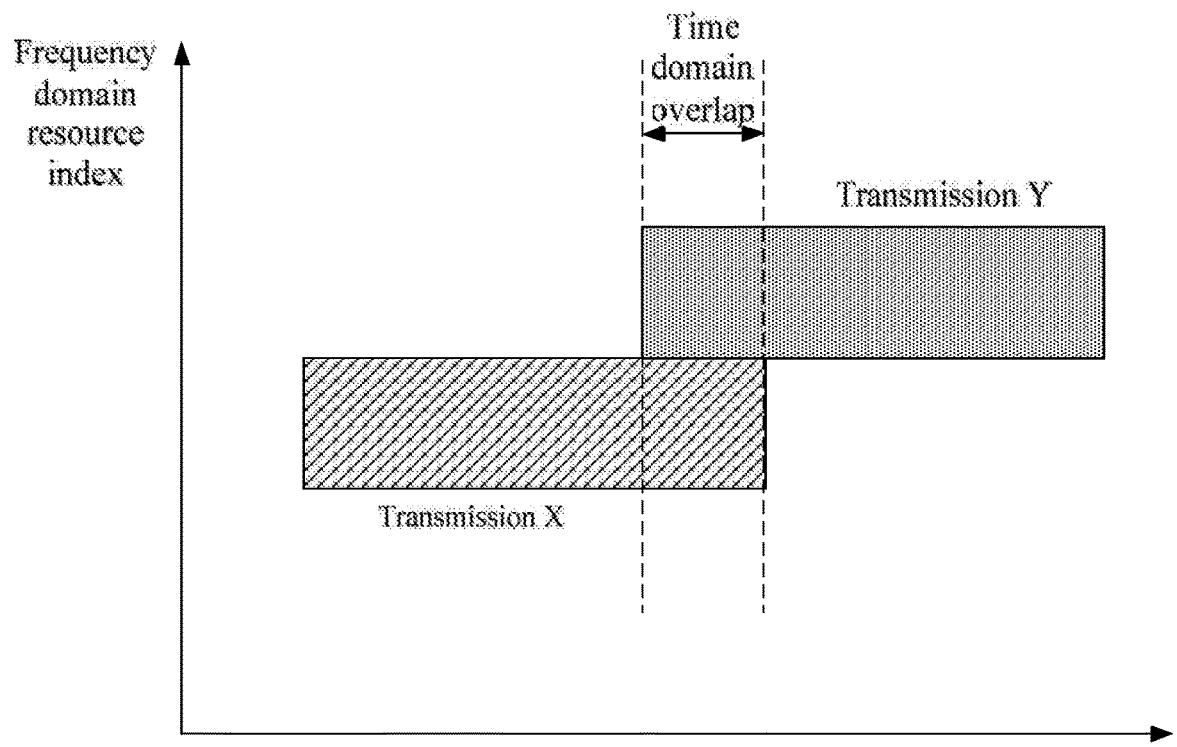
FIG. 6 is a schematic diagram (one) of a configuration of timing advance information between communication nodes according to an embodiment of the present disclosure.
Figure 7:
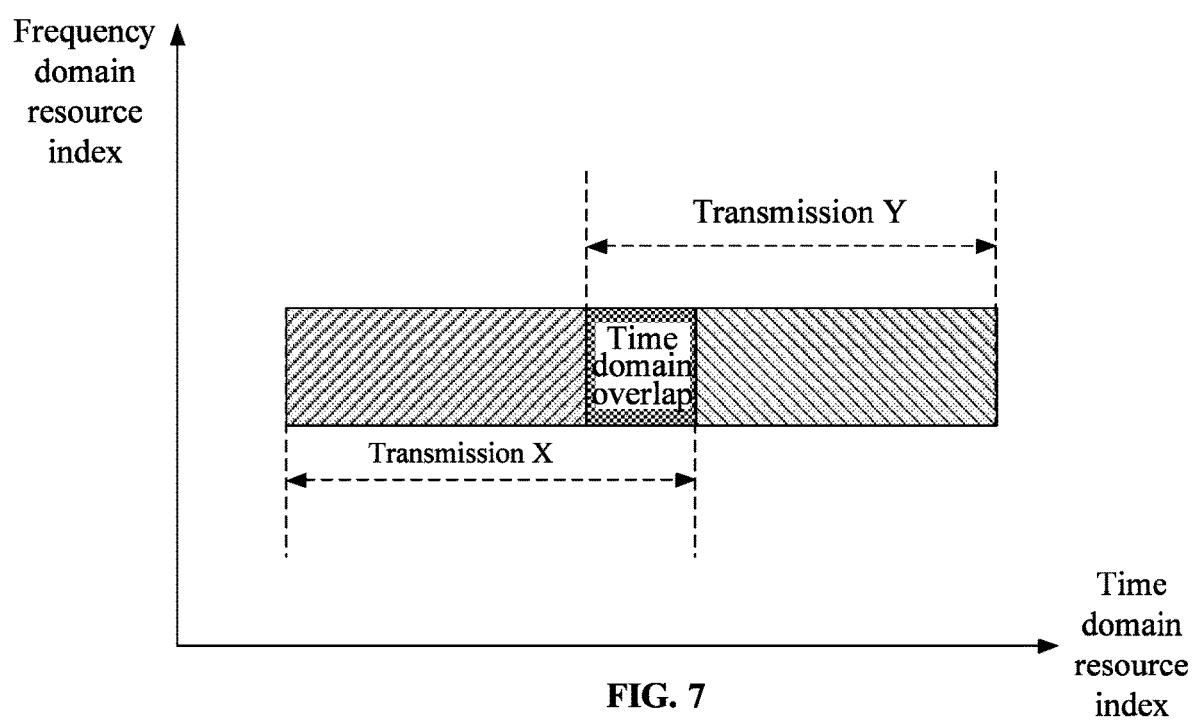
FIG. 7 is a schematic diagram (two) of a configuration of timing advance information between communication nodes according to an embodiment of the present disclosure.

In this example, a configuration method for time advance information between communication nodes is provided, as shown in FIGS. 6 and 7, when a transmission X and a transmission Y occupy an overlapping resource, the details are described below.

In an embodiment, a terminal abandons transmitting the transmission X.

In an embodiment, the terminal abandons transmitting the transmission.

In an embodiment, a terminal transmits the transmission X and the transmission Y according to timing advance configuration information corresponding to the transmission X.

In an embodiment, the terminal transmits the transmission X and the transmission Y according to timing advance configuration information corresponding to the transmission Y In an embodiment, the terminal transmits the transmission X and the transmission Y according to timing advance configuration information corresponding to a transmission with a high priority in the transmission X and the transmission Y In an embodiment, the terminal abandons a transmission with a low priority in the transmission X and the transmission Y In an embodiment, the transmission X and the transmission Y as shown in FIGS. 6 and 7 may be one of: different transmission links, or different transmission configurations corresponding to a same transmission link.

In an embodiment, the overlapping resource includes one of: a same time domain resource unit occupied by a time domain resource allocated for multiple transmissions; a same frequency domain resource block unit occupied by a frequency domain resource allocated for the multiple transmissions; or a same spatial domain resource unit occupied by a spatial domain resource allocated for the multiple transmissions.

In an embodiment, a priority definition between transmissions may be one of: an aperiodic uplink sounding reference signal>a semi-continuous uplink sounding reference signal>a periodic uplink sounding reference signal; a reference signal for antenna switching (for obtaining downlink channel information)>a reference signal for acquisition of uplink channel information>a reference signal for uplink beam training; a short physical uplink link control channel (PUCCH)>a long PUCCH; the short PUCCH>a PUSCH>the long PUCCH; a PUCCH used for reporting ACK/NACK>an uplink sounding reference signal; the PUSCH>the uplink sounding reference signal; a PUSCH bearing the downlink channel information>a PUSCH only bearing uplink data; the PUSCH>a PUCCH only bearing the downlink channel information; the PUCCH used for reporting ACK/NACK>the PUCCH; the aperiodic uplink sounding reference signal>the PUCCH only bearing the downlink channel information>the semi-continuous uplink sounding reference signal; a PUCCH/PUSCH related to bearing of a service with high quality of service (QoS)>a PUCCH/PUSCH related to bearing of a service with low QoS; a PUSCH configured by adopting a modulation coding scheme (MCS)/channel quality (CQI) based on a low block error rate (BLER)>PUSCH configured by adopting the MCS/CQI based on a high BLER; a low-delay high-reliability service has a priority to a broadband data service; in a same link, a transmission configuration with a low index has a priority to a transmission configuration with a high transmission configuration index; a transmission link with a low transmission link index has a priority to a transmission link with a high transmission link index.

Example 3

Figure 8:
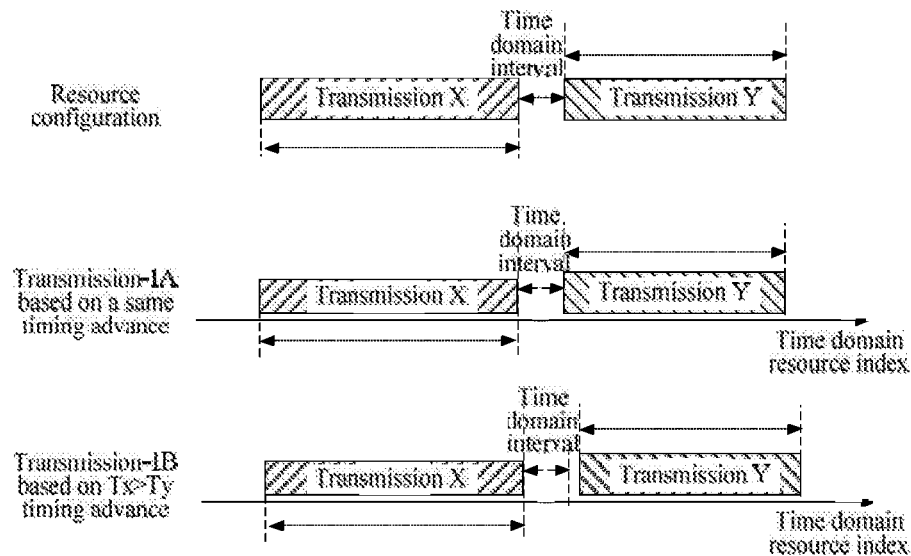
FIG. 8 is a schematic diagram (one) of a configuration of timing advance information between another communication node according to an embodiment of the present disclosure.
Figure 9:
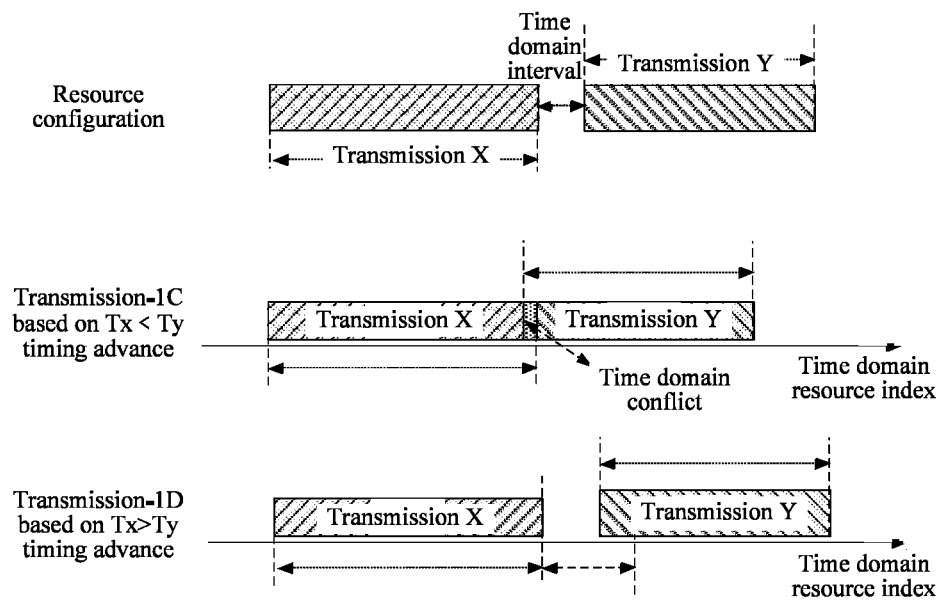
FIG. 9 is a schematic diagram (two) of a configuration of timing advance information between another communication node according to an embodiment of the present disclosure.

In this example, a configuration method for time advance information between communication nodes is provided, as shown in FIGS. 8 and 9, when a transmission X and a transmission Y occupy adjacent resources, the details are described below.

In an embodiment, the transmission X and the transmission Y as shown in FIGS. 8 and 9 may be one of: different transmission links, or different transmission configurations corresponding to a same transmission link.

In an embodiment, the adjacent resources include one of: a time domain resource interval $k_t$ allocated for multiple transmissions is greater than or equal to 0; a frequency domain resource interval $k_f$ allocated for the multiple transmissions is greater than or equal to 0; or a space domain resource interval $k_s$ allocated for the multiple transmissions is greater than or equal to 0.

In an embodiment, a threshold corresponding to an interval of the adjacent resources occupied by the multiple transmissions means that the multiple transmissions are not overlapped on time domain, frequency domain or space domain resources when a terminal adopts respective timing advance configuration information of the multiple transmissions for transmission.

In an embodiment, a threshold corresponding to an interval of adjacent time domain resources occupied by the multiple transmissions is determined through one of following manners.

It is determined by a capability of the second transmission node.

It is determined by a predefined rule including at least one of following components:

a component one, which is a difference value or an absolute value of the difference value between the timing advance information of the previous transmission link and the timing advance information of the subsequent transmission link in the two transmission links occupying the adjacent time domain resources; a component two, which is a difference value or an absolute value of the difference value between the timing advance information of the subsequent transmission link and the timing advance information of the previous transmission link in the two transmission links occupying the adjacent time domain resources; or a third component, which is time for the second transmission node to perform timing advance processing according to the timing advance information In an embodiment, if a time domain resource interval allocated for the transmission X and the transmission Y is $k_t=0$, but timing advance configuration information of the transmission X and the transmission Y is consistent, the terminal transmits the transmission X and the transmission according to the timing advance information corresponding to the transmission X and the transmission Y In an embodiment, if the time domain resource interval $k_t$ allocated for the transmission X and the transmission Y is less than the threshold $k_0^t$ corresponding to the interval between adjacent time domain resources occupied by the multiple transmissions:

In an embodiment, the terminal abandons transmitting the transmission X.

In an embodiment, the terminal abandons transmitting the transmission Y

In an embodiment, the terminal transmits the transmission X and the transmission Y according to timing advance configuration information corresponding to the transmission X.

In an embodiment, the terminal transmits the transmission X and the transmission Y according to timing advance configuration information corresponding to the transmission Y In an embodiment, the terminal transmits the transmission X and the transmission Y according to timing advance configuration information corresponding to a transmission with a high priority in the transmission X and the transmission Y In an embodiment, the terminal abandons a transmission with a low priority in the transmission X and the transmission Y Example 4

Figure 10:
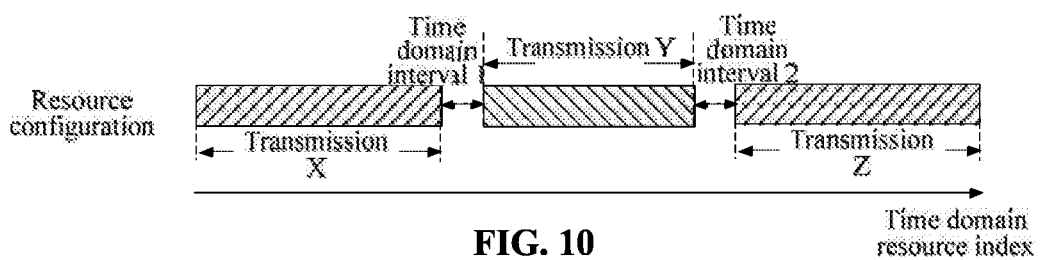
FIG. 10 is a schematic diagram of a configuration method for timing advance information according to an embodiment of the present disclosure.

In this example, a configuration method for time advance information between communication nodes is provided. As shown in FIG. 10, when a transmission X, a transmission Y, and a transmission Z occupy adjacent resources, the details are described below.

In an embodiment, the transmission X, the transmission Y, and the transmission Z as shown in FIG. 10 may be one of: different transmission links, or different transmission configurations corresponding to a same transmission link.

In an embodiment, the adjacent resources include one of: a time domain resource interval $k_t$ allocated for multiple transmissions is greater than or equal to 0; a frequency domain resource interval $k_f$ allocated for the multiple transmissions is greater than or equal to 0; or a space domain resource interval $k_s$ allocated for the multiple transmissions is greater than or equal to 0.

In an embodiment, a threshold corresponding to an interval between the adjacent resources occupied by the multiple transmissions means that the multiple transmissions are not overlapped on time domain, frequency domain or space domain resources when a terminal adopts respective timing advance configuration information of the multiple transmissions for transmission.

In an embodiment, the terminal abandons transmitting the transmission X.

In an embodiment, the terminal abandons transmitting the transmission Y

In an embodiment, the terminal abandons transmitting the transmission Z.

In an embodiment, the terminal transmits the transmission X, the transmission Y and the transmission Z according to timing advance configuration information corresponding to the transmission X.

In an embodiment, the terminal transmits the transmission X, the transmission Y and the transmission Z according to timing advance configuration information corresponding to the transmission Y In an embodiment, the terminal transmits the transmission X, the transmission Y and the transmission Z according to timing advance configuration information corresponding to the transmission Z.

In an embodiment, the terminal transmits the transmission X, the transmission Y and the transmission Z according to largest timing advance configuration information of timing advance configuration information corresponding to the transmission X, the transmission Y and the transmission Z.

In an embodiment, the terminal transmits the transmission X, the transmission Y and the transmission Z according to smallest timing advance configuration information of the timing advance configuration information corresponding to the transmission X, the transmission Y and the transmission Z.

In an embodiment, the terminal transmits the transmission X, the transmission Y and the transmission Z according to a mean value of the timing advance configuration information corresponding to the transmission X, the transmission Y and the transmission Z.

In an embodiment, the terminal transmits the transmission X, the transmission Y and the transmission Z according to timing advance configuration information corresponding to a transmission with a high priority in the transmission X, the transmission Y and the transmission Z.

In an embodiment, the terminal abandons a transmission with a low priority in the transmission X, the transmission Y and the transmission Z.

In an embodiment, the terminal abandons a transmission with a high priority in the transmission X, the transmission Y and the transmission Z.

In an embodiment, if time domain resource interval $k_t$ allocated by the transmission X and the transmission Y is not less than a threshold $k_0^t$ corresponding to an interval of adjacent time domain resources occupied by the multiple transmissions, but an time domain resource interval $k_t$ allocated by the transmission Y and the transmission Z is less than the threshold $k_0^t$ corresponding to the interval of the adjacent time domain resources occupied by the multiple transmissions, then the terminal transmits the transmission X and the transmission Y according to timing advance information corresponding to each of the transmission X and the transmission Y, and abandons transmitting the transmission Z.

In an embodiment, if the time domain resource interval $k_t$ allocated by the transmission X and the transmission Y is not less than the threshold $k_0^t$ corresponding to the interval of the adjacent time domain resources occupied by the multiple transmissions, but the time domain resource interval $k_t$ allocated by the transmission Y and the transmission Z is less than the threshold $k_0^t$ corresponding to the interval of the adjacent time domain resources occupied by the multiple transmissions, then the terminal transmits the transmission X according to timing advance information corresponding to the transmission X, and transmits the transmission Y and the transmission Z according to timing advance information corresponding to the transmission Y In an embodiment, if the time domain resource interval $k_t$ allocated by the transmission X and the transmission Y is not less than the threshold $k_0^t$ corresponding to the interval of the adjacent time domain resources occupied by the multiple transmissions, but the time domain resource interval $k_t$ allocated by the transmission Y and the transmission Z is less than the threshold $k_0^t$ corresponding to the interval of the adjacent time domain resources occupied by the multiple transmissions, then the terminal transmits the transmission X, the transmission Y, and the transmission Z according to timing advance information corresponding to each of the transmission X, the transmission Y, and the transmission Z.

In an embodiment, if the time domain resource interval $k_t$ allocated by the transmission X and the transmission Y is less than the threshold $k_0^t$ corresponding to the interval of the adjacent time domain resources occupied by the multiple transmissions, but the time domain resource interval $k_t$ allocated by the transmission Y and the transmission Z is less than the threshold $k_0^t$ corresponding to the interval of the adjacent time domain resources occupied by the multiple transmissions, then the terminal abandons transmitting the transmission Z, and the transmitting of the transmission X and the transmission Y is further determined according to the relationship between the time domain interval of the occupied resources and the threshold.

In an embodiment, if the time domain resource interval $k_t$ allocated by the transmission X and the transmission Y is less than the threshold $k_0^t$ corresponding to the interval of the adjacent time domain resources occupied by the multiple transmissions, but the time domain resource interval $k_t$ allocated by the transmission Y and the transmission Z is not less than the threshold $k_0^t$ corresponding to the interval of the adjacent time domain resources occupied by the multiple transmissions, then the terminal transmits the transmission Z according to timing advance information corresponding to the transmission Z, and transmits the transmission X and the transmission Y according to timing advance information corresponding to the transmission Y In an embodiment, if the time domain resource interval $k_t$ allocated by the transmission X and the transmission Y is less than the threshold $k_0^t$ corresponding to the interval of the adjacent time domain resources occupied by the multiple transmissions, but the time domain resource interval $k_t$ allocated by the transmission Y and the transmission Z is not less than the threshold $k_0^t$ corresponding to the interval of the adjacent time domain resources occupied by the multiple transmissions, then the terminal transmits the transmission Y and the transmission Z according to timing advance information corresponding to each of the transmission Y and the transmission Z, and abandons transmitting the transmission X.

Example 5

Figure 11:
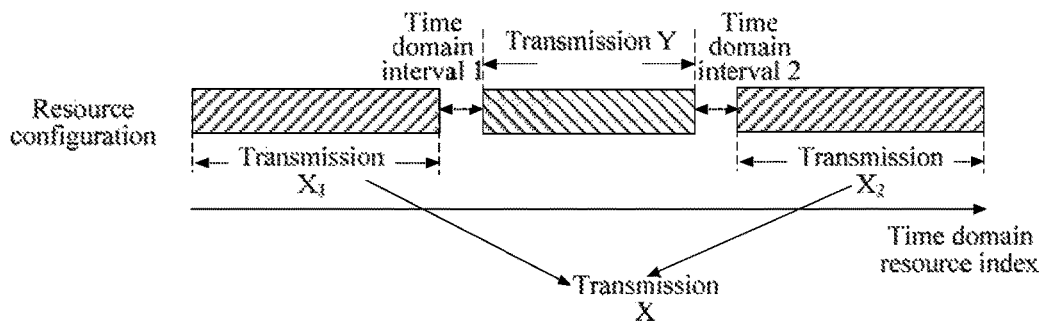
FIG. 11 is a schematic diagram (one) of a configuration of timing advance information according to an embodiment of the present disclosure.

In this example, a configuration method for time advance information between communication nodes is provided. As shown in FIG. 11, when a transmission X and a transmission Y occupy adjacent resources, the details are described below.

In an embodiment, the transmission X and the transmission Y as shown in FIG. 11 may be one of: different transmission links, or different transmission configurations corresponding to a same transmission link.

In an embodiment, the adjacent resources include one of: a time domain resource interval $k_t$ allocated for multiple transmissions is greater than or equal to 0; a frequency domain resource interval $k_f$ allocated for the multiple transmissions is greater than or equal to 0; or a space domain resource interval $k_s$ allocated for the multiple transmissions is greater than or equal to 0.

In an embodiment, a threshold corresponding to an interval between the adjacent resources occupied by the multiple transmissions means that the multiple transmissions are not overlapped on time domain, frequency domain or space domain resources when a terminal adopts respective timing advance configuration information of the multiple transmissions for transmission.

In an embodiment, a transmission X1 and a transmission X2 belong to a same transmission link.

In an embodiment, the transmission X1 and the transmission X2 belong to a same transmission configuration of a same transmission link.

In an embodiment, the transmission X1 and the transmission X2 share same timing advance configuration information.

In an embodiment, if a first time domain resource interval $k_t^1$ allocated by the transmission X1 and the transmission Y is not less than a threshold $k_t^1$ corresponding to the time domain resource interval occupied by the multiple transmissions, and a second time domain resource interval $k_t^2$ allocated by the transmission X2 and the transmission Y is not less than a threshold $k_0^{t2}$ corresponding to an interval of adjacent time domain resources occupied by the multiple transmissions, then the terminal transmits the transmission X (the transmission X1 and the transmission X2) and the transmission Y according to timing advance information corresponding to each of the transmission X (the transmission X1 and the transmission X2) and the transmission Y In an embodiment, if the first time domain resource interval $k_t^1$ allocated by the transmission X1 and the transmission Y is less than the threshold $k_0^{t1}$ corresponding to the time domain resource interval occupied by the multiple transmissions, and the second time domain resource interval $k_t^2$ allocated by the transmission X2 and the transmission Y is less than the threshold $k_0^{t2}$ corresponding to the interval of the adjacent time domain resources occupied by the multiple transmissions, then in an embodiment, the terminal abandons transmitting the transmission X (the transmission X1 and the transmission X2); in an embodiment, the terminal abandons transmitting the transmission Y; in an embodiment, the terminal transmits the transmission X (the transmission X1 and the transmission X2) and the transmission Y according to timing advance configuration information corresponding to the transmission X; in an embodiment, the terminal transmits the transmission X (the transmission X1 and the transmission X2) and the transmission Y according to timing advance configuration information corresponding to the transmission Y; in an embodiment, the terminal transmits the transmission X (the transmission X1 and the transmission X2) and the transmission Y according to timing advance configuration information corresponding to a transmission with a high priority in the transmission X (the transmission X1 and the transmission X2) and the transmission Y; and in an embodiment, the terminal abandons transmitting a transmission with a low priority in the transmission X (the transmission X1 and the transmission X2) and the transmission Y In an embodiment, if the first time domain resource interval $k_t^1$ allocated by the transmission X1 and the transmission Y is not less than the threshold $k_0^{t1}$ corresponding to the time domain resource interval occupied by the multiple transmissions, and the second time domain resource interval $k_t^2$ allocated by the transmission X2 and the transmission Y is less than the threshold $k_0^{t2}$ corresponding to the interval of the adjacent time domain resources occupied by the multiple transmissions, then in an embodiment, the terminal abandons transmitting the transmission X (the transmission X1 and the transmission X2); in an embodiment, the terminal abandons transmitting the transmission Y; in an embodiment, the terminal transmits the transmission X (the transmission X1 and the transmission X2) and the transmission Y according to timing advance configuration information corresponding to the transmission X (the transmission X1 and the transmission X2); in an embodiment, the terminal transmits the transmission X (the transmission X1 and the transmission X2) and the transmission Y according to timing advance configuration information corresponding to the transmission Y; in an embodiment, the terminal transmits the transmission X (the transmission X1 and the transmission X2) and the transmission Y according to timing advance configuration information corresponding to a transmission with a high priority in the transmission X (the transmission X1 and the transmission X2) and the transmission Y; in an embodiment, the terminal abandons a transmission with a low priority in the transmission X (the transmission X1 and the transmission X2) and the transmission Y; and in an embodiment, the terminal transmits the transmission X1 according to the timing advance configuration corresponding to the transmission X (the transmission X1 and the transmission X2) and transmits the transmission Y according to the timing advance configuration corresponding to the transmission Y, and abandons transmitting the transmission X2.

In an embodiment, if the first time domain resource interval $k_t^1$ allocated by the transmission X1 and the transmission Y is less than the threshold $k_0^{t1}$ corresponding to the time domain resource interval occupied by the multiple transmissions, and the second time domain resource interval $k_t^2$ allocated by the transmission X2 and the transmission Y is not less than the threshold $k_0^{t2}$ corresponding to the interval of the adjacent time domain resources occupied by the multiple transmissions, then in an embodiment, the terminal abandons transmitting the transmission X (the transmission X1 and the transmission X2); in an embodiment, the terminal abandons transmitting the transmission Y; in an embodiment, the terminal transmits the transmission X (the transmission X1 and the transmission X2) and the transmission Y according to timing advance configuration information corresponding to the transmission X (the transmission X1 and the transmission X2); in an embodiment, the terminal transmits the transmission X (the transmission X1 and the transmission X2) and the transmission Y according to timing advance configuration information corresponding to the transmission Y; in an embodiment, the terminal transmits the transmission X (the transmission X1 and the transmission X2) and the transmission Y according to timing advance configuration information corresponding to a transmission with a high priority in the transmission X (the transmission X1 and the transmission X2) and the transmission Y; in an embodiment, the terminal abandons a transmission with a low priority in the transmission X (the transmission X1 and the transmission X2) and the transmission Y; and in an embodiment, the terminal transmits the transmission X2 according to the timing advance configuration corresponding to the transmission X (the transmission X1 and the transmission X2) and transmits the transmission Y according to the timing advance configuration corresponding to the transmission Y, and abandons transmitting the transmission X1.

In an embodiment, $k_0^{t1}=k_0^{t2}$.

In an embodiment, $k_0^{t1}$ and $k_0^{t2}$ are acquired according to one of following manners, respectively.

It is determined by a capability of the second transmission node.

It is determined by a predefined rule including at least one of following components:

a component one, which is a difference value or an absolute value of the difference value between the timing advance information of the previous transmission link and the timing advance information of the subsequent transmission link in the two transmission links occupying the adjacent time domain resources; a component two, which is a difference value or an absolute value of the difference value between the timing advance information of the subsequent transmission link and the timing advance information of the previous transmission link in the two transmission links occupying the adjacent time domain resources; or a third component, which is time for the second transmission node to perform timing advance processing according to the timing advance information.

Example 6

Figure 12:
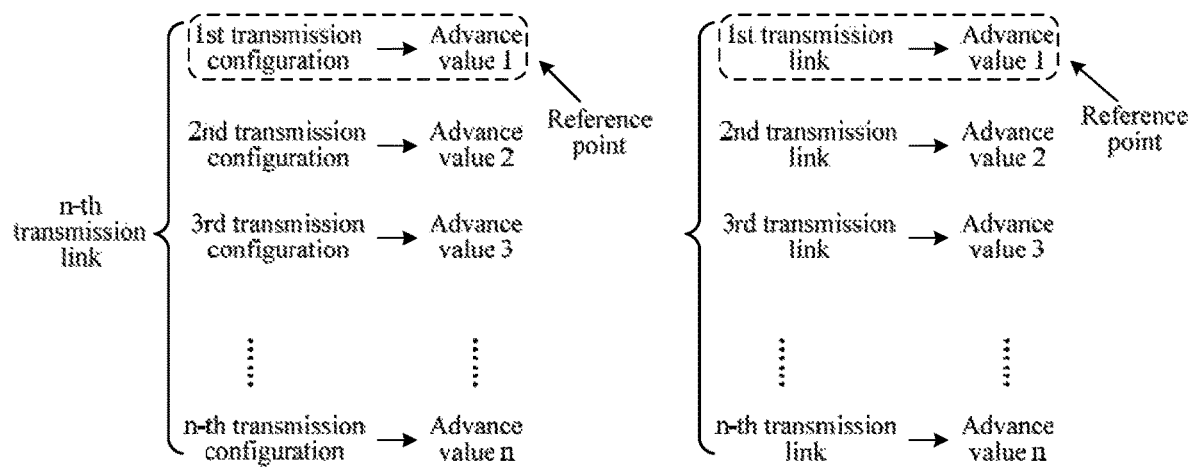
FIG. 12 is a schematic diagram (two) of a configuration method for timing advance information according to an embodiment of the present disclosure.

In this example, a configuration method for time advance information between communication nodes is provided. As shown in FIG. 12, an advance value for each transmission is given based on a specific reference point.

In an embodiment, the transmission may be one of: different transmission links, or different transmission configurations corresponding to a same transmission link.

In an embodiment, the specific reference point may be indicated, by the base station, through the information.

In an embodiment, the specific reference point may be a transmission with a lowest index in the transmission.

In an embodiment, the specific reference point may be a transmission with a highest index in the transmission.

In an embodiment, time advance configuration information corresponding to each transmission is obtained by combining configuration information of timing advance information configured for the transmission and configuration information of timing advance information corresponding to the reference point.

Through the description of the above embodiments, those skilled in the art may clearly understand that the method according to the above embodiments may be implemented by means of software plus a necessary universal hardware platform, and of course, may also be implemented by hardware, but in many cases the former is a better implementation. Based on this understanding, the technical scheme of the present disclosure, either essentially or in terms of contributions to the related art, may be embodied in the form of a software product, which is stored in a storage medium (such as a ROM/RAM, a magnetic disk, an optical disc), and includes several instructions for causing a terminal apparatus (which may be a mobile phone, a computer, a server, or a network device, etc.) to perform the methods described in the embodiments of the present disclosure.

Embodiment 2

In this embodiment, a configuration device for timing advance information is further provided, and the device is used for implementing the above-described embodiments and specific implementations, and what has been described will not be detailed again. As used below, the term "module" may implement a combination of software and/or hardware with predetermined functions. Although the devices described in following embodiments may be implemented by software, hardware or a combination of software and hardware is also possible and conceived.

Figure 13:
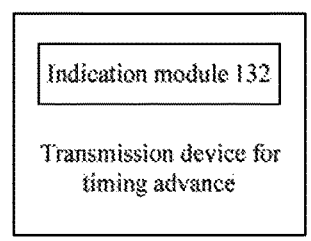
FIG. 13 is a structural block diagram of a configuration device for timing advance information according to an embodiment of the present disclosure.

FIG. 13 is a structural block diagram of a configuration device for timing advance information according to an embodiment of the present disclosure. As shown in FIG. 13, the device is applied to a first transmission node and includes described below.

1) an indication module 132, which is configured to indicate, through a number I of signaling, timing advance information corresponding to a number N of transmission links from a second transmission node to a number M of first transmission nodes, where I, M and N are all integers greater than or equal to 1.

In an embodiment, the timing advance information includes at least one of: a timing advance index, a timing advance value, a timing advance value step size, a timing advance value step size index, a timing advance value reference value, or a timing advance value reference index; each of the N transmission links includes at least one of: a data transmission channel, a control transmission channel, a random access channel, a modulation-demodulation signal, a phase noise compensation signal, a sounding reference signal, or a combination of a time division/frequency division/space division of the foregoing.

In an embodiment, the first transmission node may be a base station, and the second transmission node may be a terminal, but is not limited to this.

Through the device shown in FIG. 13, the first transmission node indicates, through the I signaling, the timing advance information corresponding to the N transmission links from the second transmission node to the M first transmission nodes, where I, M and N are all integers greater than or equal to 1. That is, the first transmission node configures, through the signaling, timing advance information required by the second transmission node for data transmission; and the second transmission node finishes configuring timing advance information from the second transmission node to the first transmission node according to the timing advance information indicated by the signaling, so as to address low transmission performance caused by the use of single TA in multi-beam/multi-station transmission in the related art, and the technical effect of improving the transmission performance is achieved.

In an embodiment, the step in which the first transmission node indicates, through the I signaling, the timing advance information corresponding to the N transmission links from the second transmission node to the M first transmission nodes includes: the first transmission node configures, through first signaling, timing advance information for a number X of transmission configuration information corresponding to a n-th transmission link, where n and X are integers greater than or equal to 1. The step in which the first transmission node configures, through the first signaling, the timing advance information for the X transmission configuration information corresponding to the n-th transmission link includes at least one of following manners.

Manner one: x-th transmission configuration information and timing advance information corresponding to the x-th transmission configuration information are jointly indicated by the first signaling, where x is an integer greater than or equal to 1; and/or if the timing advance information corresponding to the X transmission configuration information is the same, then the first transmission node configures timing advance information only for transmission configuration information with a minimum index or a maximum index among the X transmission configuration information.

Manner two: a number Y of timing advance information corresponding to the X transmission configuration information is indicated by the first signaling, where X is greater than or equal to Y; and/or when Y is equal to 1, second signaling used for indicating a correspondence between the transmission configuration information and the timing advance information is in a default state.

Manner three: the second transmission node transmits, a quantity T of maximum different timing advance information supported by the second transmission node for a number Q of transmission links transmitted by using an overlapping resource, to the first transmission node through report signaling, where Q and T are integers greater than or equal to 1; and/or if the second transmission node does not support that the Q transmission links transmitted by using the overlapping resource are configured with different timing configuration information, then T is equal to 1 by default and the report signaling is in the default state.

In an embodiment, each of the X transmission configuration information includes at least one of: a precoding index, a reference signal for acquiring a space domain transmission configuration, a transmission link index, a time domain transmission resource index, a frequency domain transmission resource index, a space domain transmission resource index, a beam index, a transmission mode, or a cyclic shift cyclic prefix (CP) configuration. The reference signal for acquiring the space domain transmission configuration includes at least one of: a downlink synchronization signal, a broadcast signal, a random access signal, a random access response signal, an uplink sounding reference signal, an uplink data demodulation reference signal, a downlink sounding reference signal, or a downlink data demodulation reference signal.

In an embodiment, when the first transmission node configures the x-th transmission configuration information of the n-th transmission link through third signaling, the timing advance information corresponding to the x-th transmission configuration information of the n-th transmission link is acquired through at least one of following manners.

Manner one: the timing advance information corresponding to the x-th transmission configuration information of the n-th transmission link keeps unchanged in one of following conditions: a same reference for determining a space domain transmission configuration exists for the x-th transmission configuration information configured through the first signaling and used for the n-th transmission link and the x-th transmission configuration information configured through the third signaling and used for the n-th transmission link; the x-th transmission configuration information configured through the first signaling and used for the n-th transmission link is a reference for a space domain transmission configuration in the x-th transmission configuration information configured through the third signaling and used for the n-th transmission link; or the x-th transmission configuration information configured through the third signaling and used for the n-th transmission link is a reference for a space domain transmission configuration in the x-th transmission configuration information configured through the first signaling and used for the n-th transmission link.

Manner two: the timing advance information corresponding to the x-th transmission configuration information of the n-th transmission link is changed to timing advance information corresponding to the x-th transmission configuration information configured through the third signaling and used for the n-th transmission link.

Manner three: the timing advance information corresponding to the x-th transmission configuration information of the n-th transmission link is configured through the third signaling.

Manner four: the timing advance information corresponding to the x-th transmission configuration information of the n-th transmission link is configured through fourth signaling.

In an embodiment, when the first transmission node configures, through fifth signaling, the timing advance information for the X transmission configuration information corresponding to the specified n-th transmission link, the timing advance information configured for the X transmission configuration information corresponding to the n-th transmission link is acquired through at least one of following manners.

Manner one: the timing advance information corresponding to the X transmission configuration information corresponding to the n-th transmission link is changed to the timing advance information configured through the fifth signaling and used for the X transmission configuration information corresponding to the n-th transmission link.

Manner two: the timing advance information corresponding to the X transmission configuration information corresponding to the n-th transmission link is composed of specified timing advance information and the timing advance information configured through the fifth signaling, and the manner two includes at least one of: for an overlapping portion between the timing advance information configured for the X transmission configuration information corresponding to the specified n-th transmission link and the timing advance information configured through the fifth signaling, the timing advance information configured through the fifth signaling is adopted; for a content which is not contained in the timing advance information configured for the X transmission configuration information corresponding to the specified n-th transmission link, the timing advance information configured through the fifth signaling is adopted; or when the timing advance information configured for the X transmission configuration information corresponding to the specified n-th transmission link only contains a timing advance index, a timing advance value corresponding to the timing advance index is given by the timing advance information configured by the first transmission node through the fifth signaling and corresponding to the X transmission configuration information corresponding to the n-th transmission link.

It should be noted that the step in which the timing advance information is configured for the X transmission configuration information corresponding to the specified n-th transmission link may be that: timing advance configuration information obtained by combining manners of acquiring the timing advance information corresponding to the x-th transmission configuration information of the n-th transmission link information when being configured through the first signaling and/or when the first transmission node configures, through the third signaling, for the x-th transmission configuration information of the n-th transmission link.

In an embodiment, in a case of a preset situation of the timing advance information corresponding to the x-th transmission configuration information of the n-th transmission link, the timing advance information corresponding to the x-th transmission configuration information of the n-th transmission link is acquired through at least one of following manners.

Manner one: the timing advance information corresponding to the x-th transmission configuration information of the n-th transmission link is the same as the timing advance information corresponding to the transmission configuration information with the minimum index or the maximum index among the X transmission configuration information corresponding to the n-th transmission link.

Manner two: the timing advance information corresponding to the x-th transmission configuration information of the n-th transmission link is consistent with timing advance information acquired in an initial access.

Manner three: the timing advance information corresponding to the x-th transmission configuration information of the n-th transmission link is timing advance information corresponding to a reference signal for acquiring a space domain transmission configuration in the x-th transmission configuration information of the n-th transmission link.

Manner four: the timing advance information corresponding to the x-th transmission configuration information of the n-th transmission link is indicated through sixth signaling which is used for scheduling the n-th transmission link to be transmitted according to a x-th transmission configuration.

Manner five: the timing advance information corresponding to the x-th transmission configuration information of the n-th transmission link is the same as reference signal timing advance information corresponding to a reference signal index indicated in the sixth signaling which is used for scheduling the n-th transmission link to be transmitted according to the x-th transmission configuration, where the reference signal is used for acquiring the space domain transmission configuration.

Manner six: the timing advance information corresponding to the x-th transmission configuration information of the n-th transmission link is the same as timing advance information corresponding to a transmission link which uses an overlapping resource with the n-th transmission link and has a higher priority than the n-th transmission link.

It should be noted that the preset situation includes but is not limited to: default, or unconfigured, or missing, or not in effect, etc.

In an embodiment, timing advance information corresponding to the Q transmission links transmitted using the overlapping resource is acquired through at least one of following manners.

Manner one: if the timing advance information is different between the transmission links using the overlapping resource, then the second transmission node transmits, according to timing advance information corresponding to a transmission link with a highest priority in the transmission links, only the transmission link with the highest priority among the transmission links.

Manner two: if the timing advance information is different between the transmission links using the overlapping resource, then the timing advance information corresponding to each and every of the transmission links is a maximum value, a minimum value or a mean value of the timing advance information corresponding to the multiple transmission links.

Manner three: if the timing advance information is different between the transmission links using the overlapping resource, then the timing advance information corresponding to each and every of the transmission links is the timing advance information corresponding to the transmission link with the highest priority among the transmission links.

Manner four: if the timing advance information is different between the X transmission configurations of the n-th transmission link using the overlapping resource, then the second transmission node transmits the n-th transmission link according to a transmission configuration with a highest priority among the X transmission configurations.

Manner five: if the timing advance information is different between the X transmission configurations of the n-th transmission link using the overlapping resource, then the timing advance information corresponding to each and every of the X transmission configurations is a maximum value, a minimum value or a mean value of the corresponding timing advance information.

Manner six: if the timing advance information is different between the X transmission configurations of the n-th transmission link using the overlapping resource, then the timing advance information corresponding to each and every of the X transmission configurations is timing advance information corresponding to the transmission configuration with the highest priority among the X transmission configurations.

Manner seven: the second transmission node transmits Z transmission links according to a priority order, where Z is greater than or equal to 1, Z is less than or equal to Q, and a total number of different timing advance information corresponding to the Z transmission links is less than or equal to T, where T is a maximum total quantity of configurations of a timing advance information supported by the second transmission node.

In an embodiment, in a case of determining that the n-th transmission link is transmitted according to a x-th transmission configuration, timing advance information corresponding to a number S of reference signals for acquiring a space domain transmission configuration is acquired through at least one of following manners, where S is an integer greater than or equal to 1.

Manner one: if the x-th transmission configuration corresponding to the n-th transmission link is a codebook-based transmission, then the timing advance information is different between the S reference signals.

Manner two: if the x-th transmission configuration corresponding to the n-th transmission link is a non-codebook-based transmission, then the timing advance information is consistent between the S reference signals, and the timing advance information is a maximum value, a minimum value or a mean value of the timing advance information corresponding to the S reference signals.

Manner three: if the S reference signals are divided into a number F of groups, then timing advance information is consistent between $S_f$ reference signals belonging to a same group, and the timing advance information is a maximum value, a minimum value or a mean value of the timing advance information corresponding to the $S_f$ reference signals, where F is greater than or equal to 1, and $S_f$ is a subset of S (i.e., $S_f \leq S$)

Manner four: if the S reference signals are divided into the F groups, then the timing advance information corresponding to the $S_f$ reference signals belonging to the same group is configured independently through signaling, where F is greater than or equal to 1.

Manner five: if the S reference signals are divided into the F groups, then the timing advance information corresponding to the $S_f$ reference signals belonging to the same group is configured uniformly through signaling for indicating grouping, where F is greater than or equal to 1.

The use of the overlapping resource by transmission links includes at least one of following conditions: condition one: time domain resources allocated for multiple transmission links occupy a same time domain resource unit; condition two: frequency domain resources allocated for the multiple transmission links occupy a same frequency domain resource unit; condition three: space domain resources allocated for the multiple transmission links occupy a same space domain resource unit; condition four: time domain resources allocated by multiple transmission configurations corresponding to the n-th transmission link at least occupy a same time domain resource unit; condition five: frequency domain resources allocated by the multiple transmission configurations corresponding to the n-th transmission link at least occupy a same frequency domain resource unit; or condition six: space domain resources allocated by the multiple transmission configurations corresponding to the n-th transmission link at least occupy a same space domain resource unit.

In an embodiment, timing advance information corresponding to Q transmission links using adjacent resources is acquired through one of following manners.

Manner one: if the timing advance information is different between transmission links using the adjacent resources, then the second transmission node transmits, according to timing advance information corresponding to a transmission link with a highest priority among multiple transmission links, only the transmission link with the highest priority among the multiple transmission links.

Manner two: if the timing advance information is different between the transmission links using the adjacent resources, then the timing advance information corresponding to each and every of the multiple transmission links is a maximum value, a minimum value or a mean value of the timing advance information corresponding to the multiple transmission links.

Manner three: if the timing advance information is different between the transmission links using the adjacent resources, then the timing advance information corresponding to each and every of the multiple transmission links is timing advance information corresponding to the transmission link with the highest priority among the multiple transmission links.

Manner four: if the timing advance information is different between the X transmission configurations of the n-th transmission link using the adjacent resources, then the second transmission node transmits the n-th transmission link according to the transmission configuration with the highest priority in the X transmission configurations.

Manner five: if the timing advance information is different between the X transmission configurations of the n-th transmission link using the adjacent resources, then the timing advance information corresponding to the X transmission configurations is a maximum value, a minimum value, or a mean value of the corresponding timing advance information.

Manner six: if the timing advance information is different between the X transmission configurations of the n-th transmission link using the adjacent resources, then the timing advance information corresponding to each and every of the X transmission configurations is the timing advance information corresponding to the transmission configuration with the highest priority among the X transmission configurations.

Manner seven: if, between two transmission links occupying adjacent time domain resources, timing advance information of a previous transmission link is not less than timing advance information of a subsequent transmission link, then the timing advance information of the two transmission links keeps unchanged.

Manner eight: if, between two transmission links occupying adjacent time domain resources, timing advance information of a previous transmission link is less than timing advance information of a subsequent transmission link, but an interval $k_t$ between the adjacent time domain resources is not less than a threshold $k_0^t$, then the timing advance information of the two transmission links keeps unchanged.

Manner nine: if, between two transmission links occupying adjacent time domain resources, timing advance information of a previous transmission link is less than timing advance information of a subsequent transmission link, then the transmission of the subsequent link is abandoned.

Manner ten: if, between two transmission configurations of the n-th transmission link occupying adjacent time domain resources, timing advance information of a previous transmission configuration is not less than timing advance information of a subsequent transmission configuration, then the timing advance information of the two transmission configurations keeps unchanged.

Manner eleven: if, between two transmission configurations of the n-th transmission link occupying adjacent time domain resources, timing advance information of a previous transmission configuration is less than timing advance information of a subsequent transmission configuration, but an interval $k_t$ between the adjacent time domain resources is not less than a threshold $k_0^t$, then the timing advance information of the two transmission configurations keeps unchanged.

Manner twelve: if, between two transmission configurations of the n-th transmission link occupying adjacent time domain resources, timing advance information of a transmission configuration of a previous transmission link is less than timing advance information of a transmission configuration of a subsequent transmission link, then the transmission of the n-th transmission link configured according to the subsequent transmission configuration is abandoned.

The use of the adjacent resources by the transmission link includes at least one of following conditions: condition one: a time domain resource interval $k_t$ allocated for the multiple transmission links is greater than or equal to 0; condition two: a frequency domain resource interval $k_f$ allocated for the multiple transmission links is greater than or equal to 0; condition three: a space domain resource interval $k_s$ allocated for the multiple transmission links is greater than or equal to 0; condition four: the time domain resource interval $k_t$ allocated by multiple transmission configurations corresponding to the n-th transmission link is greater than or equal to 0; condition five: the frequency domain resource interval $k_f$ allocated by the multiple transmission configurations corresponding to the n-th transmission link is greater than or equal to 0; or condition six: the space domain resource interval $k_s$ allocated by the multiple transmission configurations corresponding to the n-th transmission link is greater than or equal to 0.

In an embodiment, the threshold $k_0^t$ corresponding to the interval of the adjacent time domain resources is determined through at least one of following manners.

Manner one: the threshold $k_0^t$ is determined by a capability of the second transmission node.

Manner two: the threshold $k_0^t$ is determined by a predefined rule including at least one of following components: a component one, which is a difference value or an absolute value of the difference value between the timing advance information of the previous transmission link and the timing advance information of the subsequent transmission link in the two transmission links occupying the adjacent time domain resources; a component two, which is a difference value or an absolute value of the difference value between the timing advance information of the subsequent transmission link and the timing advance information of the previous transmission link in the two transmission links occupying the adjacent time domain resources; or a third component, which is time for the second transmission node to perform timing advance processing according to the timing advance information.

Manner three: if sub-carrier intervals corresponding to the adjacent time domain resources are different, the threshold $k_0^t$ uses a time domain unit corresponding to a maximum sub-carrier interval as a unit.

Manner four: the threshold $k_0^t$ is indicated by using a system minimum time unit as a unit.

Manner five: the threshold $k_0^t$ is indicted by using a minimum configuration step size of the timing advance information as a unit.

Manner six: the threshold $k_0^t$ is indicated by using a time unit as a unit.

In an embodiment, the signaling (also including the first signaling to the sixth signaling) includes one of: radio resource control (RRC) signaling; media access control (MAC) signaling; downlink control information (DCI) signaling; a combination of the RRC signaling and the MAC signaling; or any combination of the RRC signaling, the MAC signaling and the DCI signaling.

In an embodiment, the priority is determined through at least one of following manners.

Manner one: an aperiodic uplink sounding reference signal has a priority to a semi-continuous uplink sounding reference signal, and the semi-continuous uplink sounding reference signal has a priority to a periodic uplink sounding reference signal.

Manner two: a reference signal for antenna switching has a priority to a reference signal for acquisition of uplink channel information, and the reference signal for acquisition of the uplink channel information has a priority to a reference signal for uplink beam training.

Manner three: a short physical uplink link control channel (PUCCH) has a priority to a long PUCCH.

Manner four: the short PUCCH has a priority to a physical uplink shared channel (PUSCH), and the PUSCH has a priority to the long PUCCH.

Manner five: a PUCCH used for reporting ACK/NACK has a priority to an uplink sounding reference signal.

Manner six: the PUSCH has a priority to the uplink sounding reference signal.

Manner seven: a PUSCH bearing downlink channel information has a priority to a PUSCH only bearing uplink data.

Manner eight: the PUSCH has a priority to a PUCCH only bearing the downlink channel information.

Manner nine: the PUCCH used for reporting ACK/NACK has a priority to the PUSCH.

Manner ten: the aperiodic uplink sounding reference signal has a priority to the PUCCH only bearing the downlink channel information, and the PUCCH only bearing the downlink channel information has a priority to the semi-continuous uplink sounding reference signal.

Manner eleven: a PUCCH/PUSCH related to bearing of a service with high quality of service (QoS) has a priority to a PUCCH/PUSCH related to bearing of a service with low QoS.

Manner twelve: a PUSCH configured by adopting a modulation coding scheme (MCS)/channel quality (CQI) based on a low block error rate (BLER) has a priority to a PUSCH configured by adopting the MCS/CQI based on a high BLER.

Manner thirteen: a low-delay high-reliability service has a priority to a broadband data service.

Manner fourteen: in a same link, a transmission configuration with a low index has a priority to a transmission configuration with a high[[low]] transmission configuration index.

Manner H15: a transmission link with a low transmission link index has a priority to a transmission link with a high transmission link index.

Figure 14:
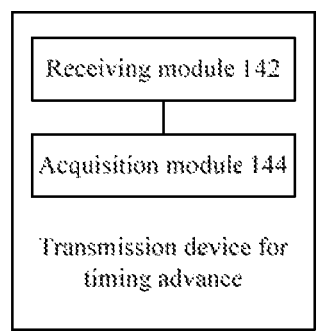
FIG. 14 is another structural block diagram of a configuration device for timing advance information according to an embodiment of the present disclosure.

In this embodiment, a configuration device for timing advance information is further provided. The device is applied to a second transmission node. As shown in FIG. 14, the device includes described below.

1) a receiving module 142, which is configured to receive a number I of signaling transmitted by a first transmission node.

2) an acquisition module 144, which is configured to acquire, through the signaling, timing advance information corresponding to a number N of transmission links from the second transmission node to a number M of first transmission nodes, where I, M and N are integers greater than or equal to 1.

In an embodiment, the first transmission node may be a base station, and the second transmission node may be a terminal, but is not limited to this.

Through the device shown in FIG. 14, the second transmission node receives the I signaling transmitted by the first transmission node; the second transmission node acquires, through the signaling, the timing advance information corresponding to the N transmission links from the second transmission node to the M first transmission nodes, where I, M and N are integers greater than or equal to 1. That is, the first transmission node configures, through the signaling, timing advance information required by the second transmission node for data transmission; and the second transmission node finishes configuring timing advance information from the second transmission node to the first transmission node according to the timing advance information indicated by the signaling, so as to address low transmission performance caused by the use of single TA in multi-beam/multi-station transmission in the related art, and the technical effect of improving the transmission performance is achieved.

In an embodiment, the step in which the second transmission node acquires, through the signaling, the timing advance information corresponding to the N transmission links from the second transmission node to the M first transmission nodes includes: the second transmission node acquires, through first signaling, timing advance information corresponding to a number X of transmission configuration information corresponding to a n-th transmission link, where n and X are integers greater than or equal to 1.

The step in which the second transmission node acquires, through the first signaling, the timing advance information corresponding to the X transmission configuration information corresponding to the n-th transmission link includes at least one of following manners.

Manner one: the second transmission node jointly acquires, through the first signaling, x-th transmission configuration information and timing advance information corresponding to the x-th transmission configuration information, where x is an integer greater than or equal to 1; and/or if the second transmission node only acquires timing advance information of transmission configuration information with a minimum or maximum index among the X transmission configuration information corresponding to the n-th transmission link, then the second transmission node uses a same timing advance information for the X transmission configuration information, where the timing advance information is the timing advance information of the transmission configuration information with the minimum or maximum index in the acquired X transmission configuration information.

Manner two: the second transmission node acquires, through the first signaling, a number Y of timing advance information corresponding to the X transmission configuration information, where X is greater than or equal to Y, and the second transmission node acquires a correspondence between the X transmission configuration information and the Y timing advance information through second signaling; and/or, if the second transmission node does not receive the second signaling, then a same timing advance information is adopted for the X transmission configuration information by the second transmission node, where the timing advance information is timing advance information acquired by the second transmission node through the first signaling.

Manner three: the second transmission node reports a quantity T of maximum different timing advance information supported by the second transmission node for a number Q of transmission links transmitted by using an overlapping resource through the signaling, where Q and T are integers greater than or equal to 1; and/or if the second transmission node does not support that the Q transmission links transmitted by using the overlapping resource are configured with different timing advance information, then T is equal to 1 by default and report signaling of the second transmission node is in a default state.

In an embodiment, when the second transmission node receives third signaling transmitted by the first transmission node and used for configuring the x-th transmission configuration information of the n-th transmission link, the second transmission node acquires the timing advance information corresponding to the x-th transmission configuration information of the n-th transmission link through at least one of following manners.

Manner one: the timing advance information corresponding to the x-th transmission configuration information of the n-th transmission link keeps unchanged in one of following conditions: a same reference for determining a space domain transmission configuration exists for the x-th transmission configuration information configured through the first signaling and used for the n-th transmission link and the x-th transmission configuration information configured through the third signaling and used for the n-th transmission link; the x-th transmission configuration information configured through the first signaling and used for the n-th transmission link is a reference for a space domain transmission configuration in the x-th transmission configuration information configured through the third signaling and used for the n-th transmission link; or the x-th transmission configuration information configured through the third signaling and used for the n-th transmission link is a reference for a space domain transmission configuration in the x-th transmission configuration information configured through the first signaling and used for the n-th transmission link.

Manner two: the second transmission node determines, according to the timing advance information corresponding to the x-th transmission configuration information of the n-th transmission link configured through the third signaling, the timing advance information corresponding to the x-th transmission configuration information of the n-th transmission link.

Manner three: the second transmission node acquires, through the third signaling, the timing advance information corresponding to the x-th transmission configuration information of the n-th transmission link.

Manner four: the second transmission node acquires, through fourth signaling, the timing advance information corresponding to the x-th transmission configuration information of the n-th transmission link.

In an embodiment, when the second transmission node receives fifth signaling, where the fifth signaling is used for configuring timing advance information corresponding to X transmission configuration information of a specified n-th transmission link, the second transmission node acquires timing advance information corresponding to the X transmission configuration information of the n-th transmission link through at least one of following manners.

Manner one: the second transmission node determines the timing advance information corresponding to the X transmission configuration information of the n-th transmission link according to the fifth signaling.

Manner two: the second transmission node jointly determining, according to specified timing advance information and timing advance information configured by the fifth signaling, the timing advance information corresponding to the X transmission configuration information of the n-th transmission link, includes at least one of: for an overlapping portion between the specified timing advance information and the timing advance information configured by the fifth signaling, the timing advance information configured by the fifth signaling is adopted; for a content which is not contained in the specified timing advance information, the timing advance information configured by the fifth signaling is adopted; or when the timing advance information configured for the X transmission configuration information corresponding to the specified n-th transmission link only contains a timing advance index, a timing advance value corresponding to the index is given by the timing advance information corresponding to the X transmission configuration information configured by the first transmission node through the fifth signaling and used for the n-th transmission link.

In an embodiment, if the second transmission node does not receive signaling transmitted by the first transmission node and used for configuring the timing advance information corresponding to the x-th transmission configuration information of the n-th transmission link, or if the signaling does not contain timing advance information, or if the configured timing advance information has not yet taken effect, then the second transmission node acquires the timing advance information corresponding to the x-th transmission configuration information of the n-th transmission link through at least one of following manners.

Manner one: the second transmission node uses, for the x-th transmission configuration information corresponding the n-th transmission link, timing advance information same as the timing advance information corresponding to the transmission configuration information with the minimum index or the maximum index among the X transmission configuration information corresponding to the n-th transmission link.

Manner two: the second transmission node uses, for the x-th transmission configuration information corresponding to the n-th transmission link, timing advance information same as timing advance information acquired in an initial access.

Manner three: the second transmission node uses, for the x-th transmission configuration information corresponding to the n-th transmission link, timing advance information same as timing advance information corresponding to a reference signal for acquiring a space domain transmission configuration in the x-th transmission configuration information of the n-th transmission link.

Manner four: the second transmission node determines, according to an instruction of sixth signaling which is used for scheduling the n-th link to be transmitted according to the x-th transmission configuration, timing advance information corresponding to the x-th transmission configuration information of the n-th transmission link.

Manner five: the second transmission node uses, for the x-th transmission configuration information of the n-th transmission link, timing advance information same as timing advance information of reference signal corresponding to a reference signal index indicated in the sixth signaling which is used for scheduling the n-th link to be transmitted according to the x-th transmission configuration, where the reference signal is used for acquiring the space domain transmission configuration.

Manner six: the second transmission node uses, for the x-th transmission configuration information of the n-th transmission link, timing advance information same as timing advance information of a transmission link which uses an overlapping resource with the transmission link and has a higher priority than the transmission link.

In an embodiment, timing advance information corresponding to the Q transmission links transmitted using the overlapping resource is acquired through at least one of following manners.

Manner one: if the timing advance information is different between the transmission links using the overlapping resource, then the second transmission node transmits, according to timing advance information corresponding to a transmission link with a highest priority in the transmission links, only the transmission link with the highest priority among the transmission links.

Manner two: if the timing advance information is different between the transmission links using the overlapping resource, then the second transmission node transmits, according to a maximum value, a minimum value or a mean value of the timing advance information corresponding to the multiple transmission links, the multiple transmission links.

Manner three: if the timing advance information is different between the transmission links using the overlapping resource, then the second transmission node transmits, according to the timing advance information corresponding to the transmission link with the highest priority among the multiple transmission links, the multiple transmission links.

Manner four: if the timing advance information is different between the X transmission configurations of the n-th transmission link using the overlapping resource, then the second transmission node transmits the n-th transmission link according to a transmission configuration with the highest priority among the X transmission configurations.

Manner five: if the timing advance information is different between the X transmission configurations of the n-th transmission link using the overlapping resource, then the second transmission node transmits, according to the X transmission configurations and a maximum value, a minimum value or a mean value of the timing advance information corresponding to the X transmission configurations, the n-th transmission link.

Manner six: if the timing advance information is different between the X transmission configurations of the n-th transmission link using the overlapping resource, then the second transmission node transmits, according to the X transmission configurations and timing advance information corresponding to the transmission configuration with the highest priority in the X transmission configurations, the n-th transmission link.

Manner seven: the second transmission node transmits Z transmission links according to a priority order, where Z is greater than or equal to 1, Z is less than or equal to Q, and a total number of different timing advance information corresponding to the Z transmission links is less than or equal to T, where T is a maximum total quantity of configurations of a timing advance information supported by the second transmission node.

In an embodiment, in a case of determining that the second transmission node transmits the n-th transmission link according to a x-th transmission configuration, timing advance information corresponding to a number S of reference signals for acquiring a space domain transmission configuration is acquired through at least one of following manners, where S is an integer greater than or equal to 1.

Manner one: if the x-th transmission configuration corresponding to the n-th transmission link is a codebook-based transmission, then the second transmission node transmits the S reference signals according to different timing advance information.

Manner two: if the x-th transmission configuration corresponding to the n-th transmission link is a codebook-based transmission, then the second transmission node transmits the S reference signals according to the same timing advance information, and the timing advance information is a maximum value, a minimum value or a mean value of the timing advance information corresponding to the S reference signals.

Manner three: if the S reference signals are divided into a number F of groups, then the second transmission node transmits $S_f$ reference signals belonging to a same group according to the same timing advance information, and the timing advance information is a maximum value, a minimum value or a mean value in the timing advance information corresponding to the $S_f$ reference signals.

Manner four: if the S reference signals are divided into the F groups, then the second transmission node acquires timing advance information of each reference signal according to the timing advance information corresponding to the $S_f$ reference signals belonging to the same group, and where F is greater than or equal to 1.

Manner five: if the S reference signals are divided into the F groups, then the second transmission node acquires the timing advance information corresponding to the $S_f$ reference signals belonging to the same group according to a grouping signaling instruction, and where F is greater than or equal to 1.

The use of the overlapping resource by transmission links includes at least one of following conditions: condition one: time domain resources allocated for multiple transmission links occupy a same time domain resource unit; condition two: frequency domain resources allocated for the multiple transmission links occupy a same frequency domain resource unit; condition three: space domain resources allocated for the multiple transmission links occupy a same space domain resource unit; condition four: time domain resources allocated by multiple transmission configurations corresponding to the n-th transmission link at least occupy a same time domain resource unit; condition five: frequency domain resources allocated by the multiple transmission configurations corresponding to the n-th transmission link at least occupy a same frequency domain resource unit; or condition six: space domain resources allocated by the multiple transmission configurations corresponding to the n-th transmission link at least occupy a same space domain resource unit.

In an embodiment, timing advance information corresponding to Q transmission links using adjacent resources is acquired through one of following manners.

Manner one: if the timing advance information is different between the transmission links using the adjacent resources, then the second transmission node transmits, according to timing advance information corresponding to a transmission link with a highest priority among multiple transmission links, only the transmission link with the highest priority among the multiple transmission links.

Manner two: if the timing advance information is different between the transmission links using the adjacent resources, then the second transmission node transmits, according to a maximum value, a minimum value or a mean value of the timing advance information corresponding to the multiple transmission links, the multiple transmission links.

Manner three: if the timing advance information is different between the transmission links using the adjacent resources, then the second transmission node transmits the multiple transmission links according to timing advance information corresponding to the transmission link with the highest priority among the multiple transmission links.

Manner four: if the timing advance information is different between the X transmission configurations of the n-th transmission link using the adjacent resources, then the second transmission node transmits the n-th transmission link according to the timing advance information corresponding to the transmission configuration with the highest priority in the X transmission configurations and according to the transmission configuration with the highest priority in the X transmission configurations.

Manner five: if the timing advance information is different between the X transmission configurations of the n-th transmission link using the adjacent resources, then the second transmission node transmits the n-th transmission link according to the X transmission configurations and a maximum value, a minimum value, or a mean value of the timing advance information corresponding to the X transmission configurations.

Manner six: if the timing advance information is different between the X transmission configurations of the n-th transmission link using the adjacent resources, then the second transmission node transmits the n-th transmission link according to the X transmission configurations and timing advance information corresponding to the transmission configuration with a highest priority in the X transmission configurations.

Manner seven: if, between two transmission links occupying adjacent time domain resources, timing advance information of a previous transmission link is not less than timing advance information of a subsequent transmission link, then the timing advance information of the two transmission links keeps unchanged.

Manner eight: if, between two transmission links occupying adjacent time domain resources, timing advance information of a previous transmission link is less than timing advance information of a subsequent transmission link, but an interval $k_t$ between the adjacent time domain resources is not less than a threshold $k_0'$, then the timing advance information of the two transmission links keeps unchanged.

Manner nine: if, between two transmission links occupying adjacent time domain resources, timing advance information of a previous transmission link is less than timing advance information of a subsequent transmission link, then the second transmission node abandons the transmission of the subsequent link.

Manner ten: if, between two transmission configurations of the n-th transmission link occupying adjacent time domain resources, timing advance information of a previous transmission configuration is not less than timing advance information of a subsequent transmission configuration, then the timing advance information of the two transmission configurations keeps unchanged.

Manner eleven: if, between two transmission configurations of the n-th transmission link occupying adjacent time domain resources, timing advance information of a previous transmission configuration is less than timing advance information of a subsequent transmission configuration, but an interval $k_t$ between the adjacent time domain resources is not less than a threshold $k_0{}^t$, then the timing advance information of the two transmission configurations keeps unchanged.

Manner twelve: if between two transmission configurations of the n-th transmission link occupying adjacent time domain resources, timing advance information of a transmission configuration of a previous transmission link is less than timing advance information of a transmission configuration of a subsequent transmission link, then the second transmission node abandons the transmission of the n-th transmission link configured according to the subsequent transmission configuration.

The use of the adjacent resources by the transmission link includes at least one of following conditions: condition one: a time domain resource interval $k_t$ allocated for the multiple transmission links is greater than or equal to 0; condition two: a frequency domain resource interval $k_f$ allocated for the multiple transmission links is greater than or equal to 0; condition three: a space domain resource interval $k_s$ allocated for the multiple transmission links is greater than or equal to 0; condition four: the time domain resource interval $k_t$ allocated by multiple transmission configurations corresponding to the n-th transmission link is greater than or equal to 0; condition five: the frequency domain resource interval $k_f$ allocated by the multiple transmission configurations corresponding to the n-th transmission link is greater than or equal to 0; or condition six: the space domain resource interval $k_s$ allocated by the multiple transmission configurations corresponding to the n-th transmission link is greater than or equal to 0.

In an embodiment, the threshold $k_0{}^t$ corresponding to the interval of the adjacent time domain resources is determined through at least one of following manners.

Manner one: the threshold $k_0{}^t$ is determined by a capability of the second transmission node.

Manner two: the threshold $k_0{}^t$ is determined by a predefined rule including at least one of following components: a component one, which is a difference value or an absolute value of the difference value between the timing advance information of the previous transmission link and the timing advance information of the subsequent transmission link in the two transmission links occupying the adjacent time domain resources; a component two, which is a difference value or an absolute value of the difference value between the timing advance information of the subsequent transmission link and the timing advance information of the previous transmission link in the two transmission links occupying the adjacent time domain resources; or a third component, which is time for the second transmission node to perform timing advance processing according to the timing advance information.

Manner three: if sub-carrier intervals corresponding to the adjacent time domain resources are different, then the threshold $k_0{}^t$ uses a time domain unit corresponding to a maximum sub-carrier interval as a unit.

Manner four: the threshold $k_0{}^t$ is indicated by using a system minimum time unit as a unit.

Manner five: the threshold $k_0{}^t$ is indicated by using a minimum configuration step size of the timing advance information as a unit.

Manner six: the threshold $k_0{}^t$ is indicated by using a time unit as a unit.

It should be noted that each of the above modules may be implemented by software or hardware. For the latter, it may be implemented in following manner, but not limited to this: the above modules are all located in a same processor; or, the above modules are located in different processors in any combination.

Embodiment 3

An embodiment of the present disclosure further provides a storage medium. The storage medium stores computer programs, the computer programs are executed to perform the steps in any one of the above-described method embodiments.

In an embodiment, in this embodiment, the above-described storage medium may be configured to store computer programs for performing following steps: S1, a first transmission node, through a number I of signaling, indicates timing advance information corresponding to a number N of transmission links from a second transmission node to a number M of first transmission nodes, where I, M and N are all integers greater than or equal to 1.

In an embodiment, the storage medium is further configured to store computer programs for performing following steps: S1, the second transmission node receives the I signaling transmitted by the first transmission node; S2, the second transmission node acquires, through the signaling, the timing advance information corresponding to the N transmission links between the second transmission node and the M first transmission nodes, where I, M and N are integers greater than or equal to 1.

In an embodiment, in this embodiment, the above-described storage medium may include, but is not limited to, various media that may store computer programs, such as a USB flash drive, a read-only memory (referred to as ROM), a random access memory (referred to as RAM), a portable hard disk, a magnetic disk or an optical disk.

An embodiment of the present disclosure further provides an electronic device. The electronic device includes a memory and a processor, the memory stores computer programs, and the processor is configured to execute the computer programs to perform the steps in any one of the above-described method embodiments.

In an embodiment, the above-described electronic device may further include a transmission apparatus and an input-output apparatus. The transmission apparatus is connected to the above-described processor, and the input-output apparatus is connected to the above-described processor.

In an embodiment, in this embodiment, the above-described processor may be configured to perform following steps through the computer programs: S1, a first transmission node, through a number I of signaling, indicates timing advance information corresponding to a number N of transmission links from a second transmission node to a number M of first transmission nodes, where I, M and N are all integers greater than or equal to 1.

In an embodiment, the above-described electronic device is further configured to store computer programs for performing following steps: S1, the second transmission node receives the I signaling transmitted by the first transmission node; S2, the second transmission node acquires, through the signaling, the timing advance information corresponding to the N transmission links between the second transmission node and the M first transmission nodes, where I, M and N are integers greater than or equal to 1.

In an embodiment, specific examples in this embodiment may refer to examples described in the embodiments and specific implementations described above, which will not be detailed in this embodiment again.

Apparently, it should be understood by those skilled in the art that each of the above-described modules or steps of the present application may be implemented by a general-purpose computing device, the modules or steps may be concentrated on a single computing device or distributed on a network composed of multiple computing devices. In an embodiment, the modules or steps may be implemented by program codes executable by the computing devices, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above contents are merely specific embodiments of the present application and are not intended to limit the present application. Various modifications and variations may be made by those skilled in the art to the present application. Any modification, equivalent replacement, improvement, etc. made within the principles of the present application should be included in the scope of protection of the present application.

What is claimed is:

1. A configuration method for timing advance information, comprising:
    indicating, by a first transmission node, through a number I of signaling, timing advance information corresponding to a number N of transmission links from a second transmission node to a number M of first transmission nodes, wherein I, M and N are all integers greater than or equal to 1;
wherein indicating, by the first transmission node, through the I signaling, the timing advance information corresponding to the N transmission links from the second transmission node to the M first transmission nodes comprises:
    configuring, by the first transmission node, through first signaling, timing advance information for a number X of transmission configuration information corresponding to a n-th transmission link, wherein n and X are integers greater than or equal to 1;
wherein configuring, by the first transmission node, through the first signaling, the timing advance information for the X transmission configuration information corresponding to the n-th transmission link comprises at least one of following manners:
    manner one, which comprises at least one of: a x-th transmission configuration information and timing advance information corresponding to the x-th transmission configuration information are jointly indicated by the first signaling, wherein x is an integer greater than or equal to 1; or in a case where the timing advance information corresponding to the X transmission configuration information is the same, the first transmission node configures timing advance information only for transmission configuration information with a minimum index or a maximum index among the X transmission configuration information;
    manner two, which comprises at least one of: a number Y of timing advance information corresponding to the X transmission configuration information are indicated by the first signaling, wherein X is greater than or equal to Y; or in a case where Y is equal to 1, second signaling used for indicating a correspondence between the transmission configuration information and the timing advance information is in a default state; or
    manner three, which comprises at least one of: the second transmission node transmits, a quantity T of maximum different timing advance information supported by the second transmission node for a number Q of transmission links transmitted by using an overlapping resource, to the first transmission node through report signaling, wherein Q and T are integers greater than or equal to 1, or in a case where the second transmission node does not support that the Q transmission links transmitted by using the overlapping resource are configured with different timing configuration information, T is equal to 1 by default and the report signaling is in the default state.

2. The method of claim 1, wherein the timing advance information comprises at least one of:
    a timing advance index, a timing advance value, a timing advance value step size, a timing advance value step size index, a timing advance value reference value, or a timing advance value reference index.

3. The method of claim 1, wherein each of the N transmission links comprises at least one of:
    a data transmission channel, a control transmission channel, a random access channel, a modulation-demodulation signal, a phase noise compensation signal, or a sounding reference signal.

4. The method of claim 1, wherein each of the X transmission configuration information comprises at least one of:
    a precoding index, a reference signal for acquiring a space domain transmission configuration, a transmission link index, a time domain transmission resource index, a frequency domain transmission resource index, a space domain transmission resource index, a beam index, a transmission mode, or a cyclic shift cyclic prefix (CP) configuration;
wherein the reference signal for acquiring the space domain transmission configuration comprises at least one of: a downlink synchronization signal, a broadcast signal, a random access signal, a random access response signal, an uplink sounding reference signal, an uplink data demodulation reference signal, a downlink sounding reference signal, or a downlink data demodulation reference signal.

5. The method of claim 1, wherein in a case where the first transmission node configures the x-th transmission configuration information of the n-th transmission link through third signaling, the timing advance information corresponding to the x-th transmission configuration information of the n-th transmission link is acquired through at least one of following manners:
    manner A1: the timing advance information corresponding to the x-th transmission configuration information of the n-th transmission link keeps unchanged in one of following conditions: a same reference for determining a space domain transmission configuration exists for the x-th transmission configuration information configured through the first signaling and used for the n-th transmission link and the x-th transmission configuration information configured through the third signaling and used for the n-th transmission link; the x-th transmission configuration information configured through the first signaling and used for the n-th transmission link is a reference for a space domain transmission configuration in the x-th transmission configuration information configured through the third signaling and used for the n-th transmission link; or the x-th transmission configuration information configured through the third signaling and used for the n-th transmission link is a reference for a space domain transmission configuration in the x-th transmission configuration information configured through the first signaling and used for the n-th transmission link;

manner A2: the timing advance information corresponding to the x-th transmission configuration information of the n-th transmission link is changed to timing advance information corresponding to the x-th transmission configuration information configured through the third signaling and used for the n-th transmission link;

manner A3: the timing advance information corresponding to the x-th transmission configuration information of the n-th transmission link is configured through the third signaling; or manner A4: the timing advance information corresponding to the x-th transmission configuration information of the n-th transmission link is configured through fourth signaling.

6. The method of claim 1, wherein in a case where the first transmission node configures, through fifth signaling, the timing advance information for the X transmission configuration information corresponding to the specified n-th transmission link, the timing advance information configured for the X transmission configuration information corresponding to the n-th transmission link is acquired through at least one of following manners:

manner B1: the timing advance information corresponding to the X transmission configuration information corresponding to the n-th transmission link is changed to the timing advance information configured through the fifth signaling and used for the X transmission configuration information corresponding to the n-th transmission link; or manner B2: the timing advance information corresponding to the X transmission configuration information corresponding to the n-th transmission link to be composed of specified timing advance information and the timing advance information configured through the fifth signaling, and the manner B2 comprises at least one of:

for an overlapping portion between the timing advance information configured for the X transmission configuration information corresponding to the specified n-th transmission link and the timing advance information configured through the fifth signaling, the timing advance information configured through the fifth signaling is adopted;

for a content which is not contained in the timing advance information configured for the X transmission configuration information corresponding to the specified n-th transmission link, the timing advance information configured through the fifth signaling is adopted; or in a case where the timing advance information configured for the X transmission configuration information corresponding to the specified n-th transmission link only contains a timing advance index, a timing advance value corresponding to the timing advance index is given by the timing advance information configured by the first transmission node through the fifth signaling and corresponding to the X transmission configuration information corresponding to the n-th transmission link.

7. The method of claim 1, wherein in a case of a preset situation of the timing advance information corresponding to the x-th transmission configuration information of the n-th transmission link, the timing advance information corresponding to the x-th transmission configuration information of the n-th transmission link is acquired through at least one of following manners:

manner C1: the timing advance information corresponding to the x-th transmission configuration information of the n-th transmission link is the same as the timing advance information corresponding to the transmission configuration information with the minimum index or the maximum index among the X transmission configuration information corresponding to the n-th transmission link;

manner C2: the timing advance information corresponding to the x-th transmission configuration information of the n-th transmission link is consistent with timing advance information acquired in an initial access;

manner C3: the timing advance information corresponding to the x-th transmission configuration information of the n-th transmission link is timing advance information corresponding to a reference signal for acquiring a space domain transmission configuration in the x-th transmission configuration information of the n-th transmission link;

manner C4: the timing advance information corresponding to the x-th transmission configuration information of the n-th transmission link is indicated through sixth signaling which is used for scheduling the n-th transmission link to be transmitted according to a x-th transmission configuration;

manner C5: the timing advance information corresponding to the x-th transmission configuration information of the n-th transmission link is the same as reference signal timing advance information corresponding to a reference signal index indicated in the sixth signaling which is used for scheduling the n-th transmission link to be transmitted according to the x-th transmission configuration, wherein the reference signal is used for acquiring the space domain transmission configuration; or manner C6: the timing advance information corresponding to the x-th transmission configuration information of the n-th transmission link is the same as timing advance information corresponding to a transmission link which uses an overlapping resource with the n-th transmission link and has a higher priority than the n-th transmission link.

8. The method of claim 7, wherein the priority is determined through at least one of following manners:

manner H1: an aperiodic uplink sounding reference signal has a priority to a semi-continuous uplink sounding reference signal, and the semi-continuous uplink sounding reference signal has a priority to a periodic uplink sounding reference signal;

manner H2: a reference signal for antenna switching has a priority to a reference signal for acquisition of uplink channel information, and the reference signal for acquisition of the uplink channel information has a priority to a reference signal for uplink beam training;

manner H3: a short physical uplink link control channel (PUCCH) has a priority to a long PUCCH;

manner H4: the short PUCCH has a priority to a physical uplink shared channel (PUSCH), and the PUSCH has a priority to the long PUCCH;

manner H5: a PUCCH used for reporting ACK/NACK has a priority to an uplink sounding reference signal;

manner H6: the PUSCH has a priority to the uplink sounding reference signal;

manner H7: a PUSCH bearing downlink channel information has a priority to a PUSCH only bearing uplink data;

manner H8: the PUSCH has a priority to a PUCCH only bearing the downlink channel information;

manner H9: the PUCCH used for reporting ACK/NACK has a priority to the PUSCH;

manner H10: the aperiodic uplink sounding reference signal has a priority to the PUCCH only bearing the downlink channel information, and the PUCCH only bearing the downlink channel information has a priority to the semi-continuous uplink sounding reference signal;

manner H11: a PUCCH/PUSCH related to bearing of a service with high quality of service (QoS) has a priority to a PUCCH/PUSCH related to bearing of a service with low QoS;

manner H12: a PUSCH configured by adopting a modulation coding scheme (MCS)/channel quality (CQI) based on a low block error rate (BLER) has a priority to a PUSCH configured by adopting the MCS/CQI based on a high BLER;

manner H13: a low-delay high-reliability service has a priority to a broadband data service;

manner H14: in a same link, a transmission configuration with a low index has a priority to a transmission configuration with a high transmission configuration index; or manner H15: a transmission link with a low transmission link index has a priority to a transmission link with a high transmission link index.

9. The method of claim 1, wherein timing advance information corresponding to the Q transmission links transmitted using the overlapping resource is acquired through at least one of following manners:

manner D1: in a case where the timing advance information is different between the transmission links using the overlapping resource, the second transmission node transmits, according to timing advance information corresponding to a transmission link with a highest priority in the transmission links, only the transmission link with the highest priority among the transmission links;

manner D2: in a case where the timing advance information is different between the transmission links using the overlapping resource, the timing advance information corresponding to each and every of the transmission links is a maximum value, a minimum value or a mean value of the timing advance information corresponding to the transmission links;

manner D3: in a case where the timing advance information is different between the transmission links using the overlapping resource, the timing advance information corresponding to each and every of the transmission links is the timing advance information corresponding to the transmission link with the highest priority among the transmission links;

manner D4: in a case where the timing advance information is different between the X transmission configurations of the n-th transmission link using the overlapping resource, the second transmission node transmits the n-th transmission link according to a transmission configuration with a highest priority among the X transmission configurations;

manner D5: in a case where the timing advance information is different between the X transmission configurations of the n-th transmission link using the overlapping resource, the timing advance information corresponding to each and every of the X transmission configurations is a maximum value, a minimum value or a mean value of the corresponding timing advance information;

manner D6: in a case where the timing advance information is different between the X transmission configurations of the n-th transmission link using the overlapping resource, the timing advance information corresponding to each and every of the X transmission configurations is timing advance information corresponding to the transmission configuration with the highest priority among the X transmission configurations; or manner D7: the second transmission node transmits Z transmission links according to a priority order, wherein Z is greater than or equal to 1, Z is less than or equal to Q, and a total number of different timing advance information corresponding to the Z transmission links is less than or equal to T, wherein T is a maximum total quantity of configurations of a timing advance information supported by the second transmission node.

10. The method of claim 1, wherein in a case of determining that the n-th transmission link is transmitted according to a x-th transmission configuration, timing advance information corresponding to a number S of reference signals for acquiring a space domain transmission configuration is acquired through at least one of following manners, wherein S is an integer greater than or equal to 1:

manner E1: in a case where the x-th transmission configuration corresponding to the n-th transmission link is a codebook-based transmission, the timing advance information is different between the S reference signals;

manner E2: in a case where the x-th transmission configuration corresponding to the n-th transmission link is a non-codebook-based transmission, the timing advance information is consistent between the S reference signals, and the timing advance information is a maximum value, a minimum value or a mean value of the timing advance information corresponding to the S reference signals;

manner E3: in a case where the S reference signals are divided into a number F of groups, timing advance information is consistent between $S_f$ reference signals belonging to a same group, and the timing advance information is a maximum value, a minimum value or a mean value of the timing advance information corresponding to the $S_f$ reference signals, wherein F is greater than or equal to 1, and $S_f$ is a subset of S;

manner E4: in a case where the S reference signals are divided into the F groups, the timing advance information corresponding to the $S_f$ reference signals belonging to the same group is configured independently through signaling, wherein F is greater than or equal to 1; or manner E5: in a case where the S reference signals are divided into the F groups, the timing advance information corresponding to the $S_f$ reference signals belonging to the same group is configured uniformly through signaling for indicating grouping, wherein F is greater than or equal to 1;

wherein the use of the overlapping resource by transmission links comprises at least one of following conditions:

condition one: time domain resources allocated for a plurality of transmission links occupy a same time domain resource unit;

condition two: frequency domain resources allocated for the plurality of transmission links occupy a same frequency domain resource unit;

condition three: space domain resources allocated for the plurality of transmission links occupy a same space domain resource unit;

condition four: time domain resources allocated by a plurality of transmission configurations corresponding to the n-th transmission link at least occupy a same time domain resource unit;

condition five: frequency domain resources allocated by the plurality of transmission configurations corresponding to the n-th transmission link at least occupy a same frequency domain resource unit; or condition six: space domain resources allocated by the plurality of transmission configurations corresponding to the n-th transmission link at least occupy a same space domain resource unit.

11. The method of claim 1, wherein timing advance information corresponding to Q transmission links using adjacent resources is acquired through one of following manners:

manner F1: in a case where the timing advance information is different between transmission links using the adjacent resources, the second transmission node transmits, according to timing advance information corresponding to a transmission link with a highest priority among a plurality of transmission links, only the transmission link with the highest priority among the plurality of transmission links;

manner F2: in a case where the timing advance information is different between the transmission links using the adjacent resources, the timing advance information corresponding to each and every of the plurality of transmission links is a maximum value, a minimum value or a mean value of the timing advance information corresponding to the plurality of transmission links;

manner F3: in a case where the timing advance information is different between the transmission links using the adjacent resources, the timing advance information corresponding to each and every of the plurality of transmission links is timing advance information corresponding to the transmission link with the highest priority among the plurality of transmission links;

manner F4: in a case where the timing advance information is different between the X transmission configurations of the n-th transmission link using the adjacent resources, the second transmission node transmits the n-th transmission link according to the transmission configuration with the highest priority in the X transmission configurations;

manner F5: in a case where the timing advance information is different between the X transmission configurations of the n-th transmission link using the adjacent resources, the timing advance information corresponding to each and every of the X transmission configurations is a maximum value, a minimum value, or a mean value of the corresponding timing advance information;

manner F6: in a case where the timing advance information is different between the X transmission configurations of the n-th transmission link using the adjacent resources, the timing advance information corresponding to each and every of the X transmission configurations is the timing advance information corresponding to the transmission configuration with the highest priority among the X transmission configurations;

manner F7: in a case where, between two transmission links occupying adjacent time domain resources, timing advance information of a previous transmission link is not less than timing advance information of a subsequent transmission link, the timing advance information of the two transmission links keeps unchanged;

manner F8: in a case where, between two transmission links occupying adjacent time domain resources, timing advance information of a previous transmission link is less than timing advance information of a subsequent transmission link, but an interval $k_t$ between the adjacent time domain resources is not less than a threshold $k_0^t$, the timing advance information of the two transmission links keeps unchanged;

manner F9: in a case where, between two transmission links occupying adjacent time domain resources, timing advance information of a previous transmission link is less than timing advance information of a subsequent transmission link, the transmission of the subsequent link is abandoned;

manner F10: in a case where, between two transmission configurations of the n-th transmission link occupying adjacent time domain resources, timing advance information of a previous transmission configuration is not less than timing advance information of a subsequent transmission configuration, the timing advance information of the two transmission configurations keeps unchanged;

manner F11: in a case where, between two transmission configurations of the n-th transmission link occupying adjacent time domain resources, timing advance information of a previous transmission configuration is less than timing advance information of a subsequent transmission configuration, but an interval $k_t$ between the adjacent time domain resources is not less than a threshold $k_0^t$, the timing advance information of the two transmission configurations keeps unchanged; or manner F12: in a case where, between two transmission configurations of the n-th transmission link occupying adjacent time domain resources, timing advance information of a transmission configuration of a previous transmission link is less than timing advance information of a transmission configuration of a subsequent transmission link, the transmission of the n-th transmission link configured according to the subsequent transmission configuration is abandoned;

wherein the use of the adjacent resources by the transmission link comprises at least one of following conditions:

condition one: a time domain resource interval $k_t$ allocated for the plurality of transmission links is greater than or equal to 0;

condition two: a frequency domain resource interval $k_f$ allocated for the plurality of transmission links is greater than or equal to 0;

condition three: a space domain resource interval $k_s$ allocated for the plurality of transmission links is greater than or equal to 0;

condition four: the time domain resource interval $k_t$ allocated by a plurality of transmission configurations corresponding to the n-th transmission link is greater than or equal to 0;

condition five: the frequency domain resource interval $k_f$ allocated by the plurality of transmission configurations corresponding to the n-th transmission link is greater than or equal to 0; or condition six: the space domain resource interval $k_s$ allocated by the plurality of transmission configurations corresponding to the n-th transmission link is greater than or equal to 0.

12. The method of claim 11, wherein the threshold $k_0{}^t$ corresponding to the interval of the adjacent time domain resources is determined through at least one of following manners:

manner G1: the threshold $k_0{}^t$ is determined by a capability of the second transmission node;

manner G2: the threshold $k_0{}^t$ is determined by a predefined rule comprising at least one of following components:

a component one, which is a difference value or an absolute value of the difference value between the timing advance information of the previous transmission link and the timing advance information of the subsequent transmission link in the two transmission links occupying the adjacent time domain resources; a component two, which is a difference value or an absolute value of the difference value between the timing advance information of the subsequent transmission link and the timing advance information of the previous transmission link in the two transmission links occupying the adjacent time domain resources; or a third component, which is time for the second transmission node to perform timing advance processing according to the timing advance information, manner G3: in a case where sub-carrier intervals corresponding to the adjacent time domain resources are different, the threshold $k_0{}^t$ uses a time domain unit corresponding to a maximum sub-carrier interval as a unit;

manner G4: the threshold $k_0{}^t$ is indicated by using a system minimum time unit as a unit;

manner G5: the threshold $k_0{}^t$ is indicted by using a minimum configuration step size of the timing advance information as a unit; or manner G6: the threshold $k_0{}^t$ is indicated by using a time unit as a unit.

13. The method of claim 1, wherein the signaling comprises one of:

radio resource control (RRC) signaling; media access control (MAC) signaling; downlink control information (DCI) signaling; a combination of the RRC signaling and the MAC signaling; or any combination of the RRC signaling, the MAC signaling and the DCI signaling.

14. An electronic device, comprising a memory and a processor, wherein the memory stores computer programs, and the processor is configured to execute the computer programs to perform the method of claim 1.

15. A configuration method for timing advance information, comprising:

receiving, by a second transmission node, a number I of signaling transmitted by a first transmission node; and acquiring, by the second transmission node, through the signaling, timing advance information corresponding to a number N of transmission links from the second transmission node to a number M of first transmission nodes, wherein I, M and N are integers greater than or equal to 1;

wherein acquiring, by the second transmission node, through the signaling, the timing advance information corresponding to the N transmission links from the second transmission node to the M first transmission nodes comprises: acquiring, by the second transmission node, through first signaling, timing advance information corresponding to a number X of transmission configuration information corresponding to a n-th transmission link, wherein n and X are integers greater than or equal to 1;

wherein acquiring, by the second transmission node, through the first signaling, the timing advance information corresponding to the X transmission configuration information corresponding to the n-th transmission link comprises at least one of following manners:

manner one, which comprises at least one of: the second transmission node jointly acquires, through the first signaling, x-th transmission configuration information and timing advance information corresponding to the x-th transmission configuration information, wherein x is an integer greater than or equal to 1; or in a case where the second transmission node only acquires timing advance information of transmission configuration information with a minimum or maximum index among the X transmission configuration information corresponding to the n-th transmission link, the second transmission node uses a same timing advance information for the X transmission configuration information, wherein the timing advance information is the timing advance information of the transmission configuration information with the minimum or maximum index in the acquired X transmission configuration information;

manner two, which comprises at least one of: the second transmission node acquires, through the first signaling, a number Y of timing advance information corresponding to the X transmission configuration information, wherein X is greater than or equal to Y, and the second transmission node acquires a correspondence between the X transmission configuration information and the Y timing advance information through second signaling; in a case where the second transmission node does not receive the second signaling, a same timing advance information is adopted for the X transmission configuration information by the second transmission node, wherein the timing advance information is timing advance information acquired by the second transmission node through the first signaling; or manner three, which comprises at least one of: the second transmission node reports a quantity T of maximum different timing advance information supported by the second transmission node for a number Q of transmission links transmitted by using an overlapping resource through the signaling, wherein Q and T are integers greater than or equal to 1; or in a case where the second transmission node does not support that the Q transmission links transmitted by using the overlapping resource are configured with different timing advance information, T is equal to 1 by default and report signaling of the second transmission node is in a default state.

16. The method of claim 15, wherein in a case where the second transmission node receives third signaling transmitted by the first transmission node and used for configuring the x-th transmission configuration information of the n-th transmission link, the second transmission node acquires the timing advance information corresponding to the x-th transmission configuration information of the n-th transmission link through at least one of following manners:

manner A1: the timing advance information corresponding to the x-th transmission configuration information of the n-th transmission link keeps unchanged in one of following conditions: a same reference for determining a space domain transmission configuration exists for the x-th transmission configuration information configured through the first signaling and used for the n-th transmission link and the x-th transmission configuration information configured through the third signaling and used for the n-th transmission link; the x-th transmission configuration information configured through the first signaling and used for the n-th transmission link is a reference for a space domain transmission configuration in the x-th transmission configuration information configured through the third signaling and used for the n-th transmission link; or the x-th transmission configuration information configured through the third signaling and used for the n-th transmission link is a reference for a space domain transmission configuration in the x-th transmission configuration information configured through the first signaling and used for the n-th transmission link;

manner A2: the second transmission node determines, according to the timing advance information corresponding to the x-th transmission configuration information of the n-th transmission link configured through the third signaling, the timing advance information corresponding to the x-th transmission configuration information of the n-th transmission link;

manner A3: the second transmission node acquires, through the third signaling, the timing advance information corresponding to the x-th transmission configuration information of the n-th transmission link; or manner A4: the second transmission node acquires, through fourth signaling, the timing advance information corresponding to the x-th transmission configuration information of the n-th transmission link.

17. The method of claim 15, wherein in a case where the second transmission node receives fifth signaling, wherein the fifth signaling is used for configuring timing advance information corresponding to X transmission configuration information of a specified n-th transmission link, the second transmission node acquires timing advance information corresponding to the X transmission configuration information of the n-th transmission link through at least one of following manners:

manner B1: the second transmission node determines the timing advance information corresponding to the X transmission configuration information of the n-th transmission link according to the fifth signaling; or manner B2: the second transmission node jointly determines, according to specified timing advance information and timing advance information configured by the fifth signaling, the timing advance information corresponding to the X transmission configuration information of the n-th transmission link, comprises at least one of:

for an overlapping portion between the specified timing advance information and the timing advance information configured by the fifth signaling, the timing advance information configured by the fifth signaling is adopted;

for a content which is not contained in the specified timing advance information, the timing advance information configured by the fifth signaling is adopted; or in a case where the timing advance information configured for the X transmission configuration information corresponding to the specified n-th transmission link only contains a timing advance index, a timing advance value corresponding to the index is given by the timing advance information corresponding to the X transmission configuration information configured by the first transmission node through the fifth signaling and used for the n-th transmission link.

18. The method of claim 15, wherein in a case where the second transmission node does not receive signaling transmitted by the first transmission node and used for configuring the timing advance information corresponding to the x-th transmission configuration information of the n-th transmission link, or in a case where the signaling does not contain timing advance information, or in a case where the configured timing advance information has not yet taken effect, the second transmission node acquires the timing advance information corresponding to the x-th transmission configuration information of the n-th transmission link through at least one of following manners:

manner C1: the second transmission node uses, for the x-th transmission configuration information corresponding the n-th transmission link, timing advance information same as the timing advance information corresponding to the transmission configuration information with the minimum index or the maximum index among the X transmission configuration information corresponding to the n-th transmission link;

manner C2: the second transmission node uses, for the x-th transmission configuration information corresponding to the n-th transmission link, timing advance information same as timing advance information acquired in an initial access;

manner C3: the second transmission node uses, for the x-th transmission configuration information corresponding to the n-th transmission link, timing advance information same as timing advance information corresponding to a reference signal for acquiring a space domain transmission configuration in the x-th transmission configuration information of the n-th transmission link;

manner C4: the second transmission node determines, according to an instruction of sixth signaling which is used for scheduling the n-th link to be transmitted according to the x-th transmission configuration, timing advance information corresponding to the x-th transmission configuration information of the n-th transmission link;

manner C5: the second transmission node uses, for the x-th transmission configuration information of the n-th transmission link, timing advance information same as timing advance information of reference signal corresponding to a reference signal index indicated in the sixth signaling which is used for scheduling the n-th link to be transmitted according to the x-th transmission configuration, wherein the reference signal is used for acquiring the space domain transmission configuration; or manner C6: the second transmission node uses, for the x-th transmission configuration information of the n-th transmission link, timing advance information same as timing advance information of a transmission link which uses an overlapping resource with the transmission link and has a higher priority than the transmission link.

19. The method of claim 15, wherein timing advance information corresponding to the Q transmission links transmitted using the overlapping resource is acquired through at least one of following manners:
   manner D1: in a case where the timing advance information is different between the transmission links using the overlapping resource, the second transmission node transmits, according to timing advance information corresponding to a transmission link with a highest priority in the transmission links, only the transmission link with the highest priority among the transmission links;
   manner D2: in a case where the timing advance information is different between the transmission links using the overlapping resource, the second transmission node transmits, according to a maximum value, a minimum value or a mean value of the timing advance information corresponding to the plurality of transmission links, the plurality of transmission links;
   manner D3: in a case where the timing advance information is different between the transmission links using the overlapping resource, the second transmission node transmits, according to the timing advance information corresponding to the transmission link with the highest priority among the plurality of transmission links, the plurality of transmission links;
   manner D4: in a case where the timing advance information is different between the X transmission configurations of the n-th transmission link using the overlapping resource, the second transmission node transmits the n-th transmission link according to a transmission configuration with the highest priority among the X transmission configurations;
   manner D5: in a case where the timing advance information is different between the X transmission configurations of the n-th transmission link using the overlapping resource, the second transmission node transmits, according to the X transmission configurations and a maximum value, a minimum value or a mean value of the timing advance information corresponding to the X transmission configurations, the n-th transmission link;
   manner D6: in a case where the timing advance information is different between the X transmission configurations of the n-th transmission link using the overlapping resource, the second transmission node transmits, according to the X transmission configurations and timing advance information corresponding to the transmission configuration with the highest priority in the X transmission configurations, the n-th transmission link; or
   manner D7: the second transmission node transmits Z transmission links according to a priority order, wherein Z is greater than or equal to 1, Z is less than or equal to Q, and a total number of different timing advance information corresponding to the Z transmission links is less than or equal to T, wherein T is a maximum total quantity of configurations of a timing advance information supported by the second transmission node.

20. The method of claim 15, wherein in a case of determining that the second transmission node transmits the n-th transmission link according to a x-th transmission configuration, timing advance information corresponding to a number S of reference signals for acquiring a space domain transmission configuration is acquired through at least one of following manners, wherein S is an integer greater than or equal to 1:
   manner E1: in a case where the x-th transmission configuration corresponding to the n-th transmission link is a codebook-based transmission, the second transmission node transmits the S reference signals according to different timing advance information;
   manner E2: in a case where the x-th transmission configuration corresponding to the n-th transmission link is a codebook-based transmission, the second transmission node transmits the S reference signals according to the same timing advance information, and the timing advance information is a maximum value, a minimum value or a mean value of the timing advance information corresponding to the S reference signals;
   manner E3: in a case where the S reference signals are divided into a number F of groups, the second transmission node transmits $S_f$ reference signals belonging to a same group according to the same timing advance information, and the timing advance information is a maximum value, a minimum value or a mean value in the timing advance information corresponding to the $S_f$ reference signals;
   manner E4: in a case where the S reference signals are divided into the F groups, the second transmission node acquires timing advance information of each reference signal according to the timing advance information corresponding to the $S_f$ reference signals belonging to the same group, and wherein F is greater than or equal to 1; or
   manner E5: in a case where the S reference signals are divided into the F groups, the second transmission node acquires the timing advance information corresponding to the $S_f$ reference signals belonging to the same group according to a grouping signaling instruction, and wherein F is greater than or equal to 1 wherein the use of the overlapping resource by transmission links comprises at least one of following conditions:
condition one: time domain resources allocated for a plurality of transmission links occupy a same time domain resource unit;
condition two: frequency domain resources allocated for the plurality of transmission links occupy a same frequency domain resource unit;
condition three: space domain resources allocated for the plurality of transmission links occupy a same space domain resource unit;
condition four: time domain resources allocated by a plurality of transmission configurations corresponding to the n-th transmission link at least occupy a same time domain resource unit;
condition five: frequency domain resources allocated by the plurality of transmission configurations corresponding to the n-th transmission link at least occupy a same frequency domain resource unit; or
condition six: space domain resources allocated by the plurality of transmission configurations corresponding to the n-th transmission link at least occupy a same space domain resource unit.

21. The method of claim 15, timing advance information corresponding to Q transmission links using adjacent resources is acquired through one of following manners:
   manner F1: in a case where the timing advance information is different between the transmission links using the adjacent resources, the second transmission node transmits, according to timing advance information corresponding to a transmission link with a highest priority among a plurality of transmission links, only the transmission link with the highest priority among the plurality of transmission links;

manner F2: in a case where the timing advance information is different between the transmission links using the adjacent resources, the second transmission node transmits, according to a maximum value, a minimum value or a mean value of the timing advance information corresponding to the plurality of transmission links, the plurality of transmission links;

manner F3: in a case where the timing advance information is different between the transmission links using the adjacent resources, the second transmission node transmits the plurality of transmission links according to timing advance information corresponding to the transmission link with the highest priority among the plurality of transmission links;

manner F4: in a case where the timing advance information is different between the X transmission configurations of the n-th transmission link using the adjacent resources, the second transmission node transmits the n-th transmission link according to the timing advance information corresponding to the transmission configuration with the highest priority in the X transmission configurations and according to the transmission configuration with the highest priority in the X transmission configurations;

manner F5: in a case where the timing advance information is different between the X transmission configurations of the n-th transmission link using the adjacent resources, the second transmission node transmits the n-th transmission link according to the X transmission configurations and a maximum value, a minimum value, or a mean value of the timing advance information corresponding to the X transmission configurations;

manner F6: in a case where the timing advance information is different between the X transmission configurations of the n-th transmission link using the adjacent resources, the second transmission node transmits the n-th transmission link according to the X transmission configurations and timing advance information corresponding to the transmission configuration with a highest priority in the X transmission configurations;

manner F7: in a case where, between two transmission links occupying adjacent time domain resources, timing advance information of a previous transmission link is not less than timing advance information of a subsequent transmission link, the timing advance information of the two transmission links keeps unchanged;

manner F8: in a case where, between two transmission links occupying adjacent time domain resources, timing advance information of a previous transmission link is less than timing advance information of a subsequent transmission link, but an interval $k_t$ between the adjacent time domain resources is not less than a threshold $k_0^t$, the timing advance information of the two transmission links keeps unchanged;

manner F9: in a case where, between two transmission links occupying adjacent time domain resources, timing advance information of a previous transmission link is less than timing advance information of a subsequent transmission link, the second transmission node abandons the transmission of the subsequent link;

manner F10: in a case where, between two transmission configurations of the n-th transmission link occupying adjacent time domain resources, timing advance information of a previous transmission configuration is not less than timing advance information of a subsequent transmission configuration, the timing advance information of the two transmission configurations keeps unchanged;

manner F11: in a case where, between two transmission configurations of the n-th transmission link occupying adjacent time domain resources, timing advance information of a previous transmission configuration is less than timing advance information of a subsequent transmission configuration, but an interval $k_t$ between the adjacent time domain resources is not less than a threshold $k_0^t$, the timing advance information of the two transmission configurations keeps unchanged; or manner F12: in a case where between two transmission configurations of the n-th transmission link occupying adjacent time domain resources, timing advance information of a transmission configuration of a previous transmission link is less than timing advance information of a transmission configuration of a subsequent transmission link, the second transmission node abandons the transmission of the n-th transmission link configured according to the subsequent transmission configuration;

wherein the use of the adjacent resources by the transmission link comprises at least one of following conditions:

condition one: a time domain resource interval $k_t$ allocated for the plurality of transmission links is greater than or equal to 0;

condition two: a frequency domain resource interval $k_f$ allocated for the plurality of transmission links is greater than or equal to 0;

condition three: a space domain resource interval $k_s$ allocated for the plurality of transmission links is greater than or equal to 0;

condition four: the time domain resource interval $k_t$ allocated by a plurality of transmission configurations corresponding to the n-th transmission link is greater than or equal to 0;

condition five: the frequency domain resource interval f allocated by the plurality of transmission configurations corresponding to the n-th transmission link is greater than or equal to 0; or condition six: the space domain resource interval $k^s$ allocated by the plurality of transmission configurations corresponding to the n-th transmission link is greater than or equal to 0.

22. The method of claim 21, wherein the threshold $k_0^t$ corresponding to the interval of the adjacent time domain resources is determined through at least one of following manners:

manner G1: the threshold $k_0^t$ is determined by a capability of the second transmission node;

manner G2: the threshold $k_0^t$ is determined by a predefined rule comprising at least one of following components:

a component one, which is a difference value or an absolute value of the difference value between the timing advance information of the previous transmission link and the timing advance information of the subsequent transmission link in the two transmission links occupying the adjacent time domain resources; a component two, which is a difference value or an absolute value of the difference value between the timing advance information of the subsequent transmission link and the timing advance information of the previous transmission link in the two transmission links occupying the adjacent time domain resources; or a third component, which is time for the second transmission node to perform timing advance processing according to the timing advance information, manner G3: in a case where sub-carrier intervals corresponding to the adjacent time domain resources are different, the threshold $k_0^t$ uses a time domain unit corresponding to a maximum sub-carrier interval as a unit;

manner G4: the threshold $k_0^t$ is indicated by using a system minimum time unit as a unit;

manner G5: the threshold $k_0^t$ is indicated by using a minimum configuration step size of the timing advance information as a unit; or manner G6: the threshold $k_0^t$ is indicated by using a time unit as a unit.

23. An electronic device, comprising a memory and a processor, wherein the memory stores computer programs, and the processor is configured to execute the computer programs to perform the method of claim 15.

\* \* \* \* \*